(12) United States Patent
Yamada

(10) Patent No.: US 6,359,720 B1
(45) Date of Patent: Mar. 19, 2002

(54) OPTICAL PROCESSOR USING ELECTRO-ABSORPTION TYPE OPTICAL MODULATORS

(75) Inventor: Koji Yamada, Tokyo (JP)

(73) Assignee: Oki Electric Industry Co, LTD, Tokyo (JP)

(*) Notice: Subject to any disclaimer, the term of this patent is extended or adjusted under 35 U.S.C. 154(b) by 0 days.

(21) Appl. No.: 09/450,117

(22) Filed: Nov. 26, 1999

(30) Foreign Application Priority Data

Nov. 27, 1998 (JP) .............................. 10-337960
Oct. 28, 1999 (JP) .............................. 11-306173

(51) Int. Cl.$^7$ ................................. G02F 1/03
(52) U.S. Cl. .................. 359/245; 359/237; 359/238
(58) Field of Search .............................. 359/237, 245, 359/239, 238

(56) References Cited

PUBLICATIONS

Suzuki et al. "New Applications of a Sinusoidally Driven InGaAsP Electron–absorption Modulator to In–line Optical Gates with ASE Noise Reduction Effect", IEEE Journal of Light Wave Technology, 1992, vol. 10, No. 12, pp 1912–1918.

*Primary Examiner*—Hung Xuan Dang
(74) *Attorney, Agent, or Firm*—Venable; Norman N. Kunitz

(57) ABSTRACT

An optical processor 100, includes the first optical processing unit 100a and the second optical processing unit 100b which are optically connected with each other. The first optical processing unit 100a includes an EA modulator 110, an electric signal processing device 112, which is electrically connected with the EA modulator 110, through the first and second relays 116, and 118, and a sinusoidal voltage generator 114. The second optical processing unit 100b includes a light detection means 130, the second electric signal processing device 132, which is electrically connected with the light detection means 130, through the third relay 134. In the optical processor 100, as constituted above, there can be realized the optical modulation and light detection by the EA modulator as well as the light detection by the light detection means. Consequently, it becomes possible to effectively receive the alternating multiplexed optical signal without wasting the energy thereof.

22 Claims, 19 Drawing Sheets

FIG. 11(a) 20 GHz RZ pulse trains
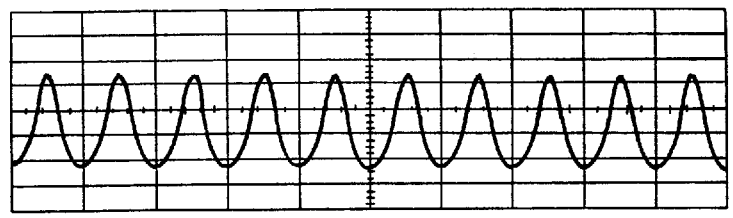
FIG. 11(b) 5 GHz, −0.65 V bias
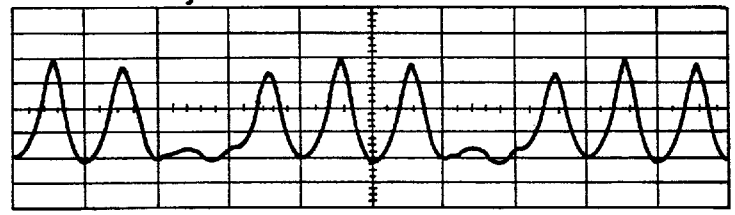
FIG. 11(c) 10 GHz, −0.85 V bias
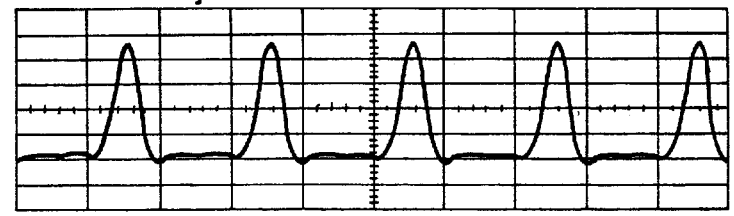
FIG. 11(d) 10 GHz, +4 V bias
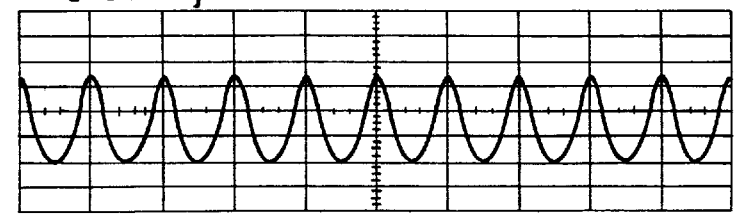
FIG. 11(e) 5 GHz, +4 V bias
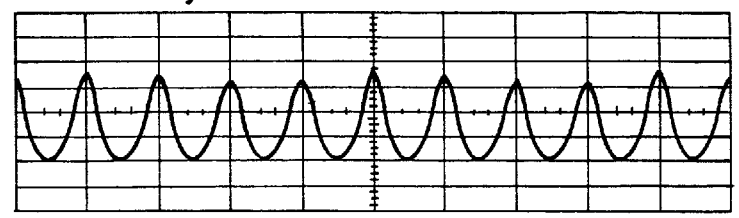

FIG. 15(a)    EA Modulator 310-1 ($V_{b1}=V_{b0}$)
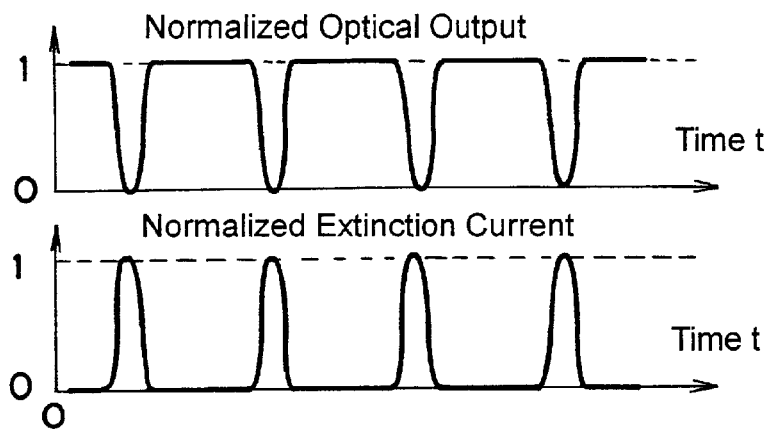
FIG. 15(b)    EA Modulator 310-2 ($V_{b2}=V_{b0}$)
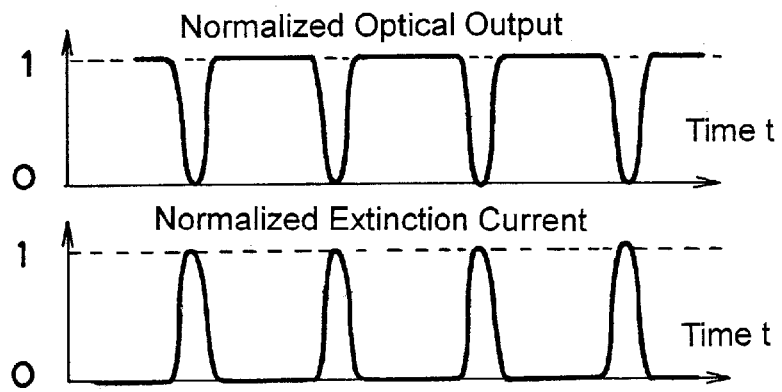
⋮
FIG. 15(c)    Light Detection Means ($V_{bn}$)
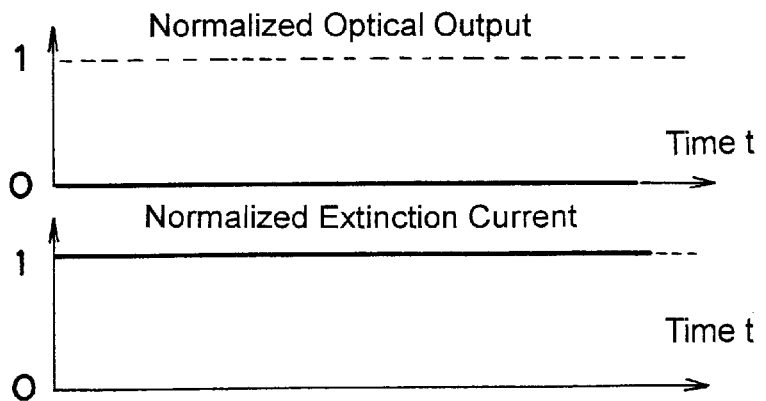

FIG. 16(a) Optical Input Signal
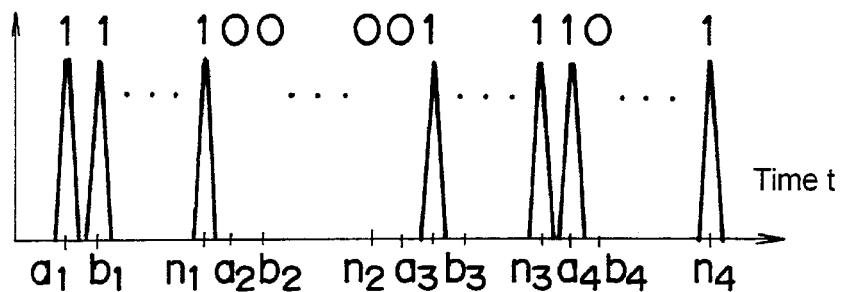
FIG. 16(b) Electric Output Signal
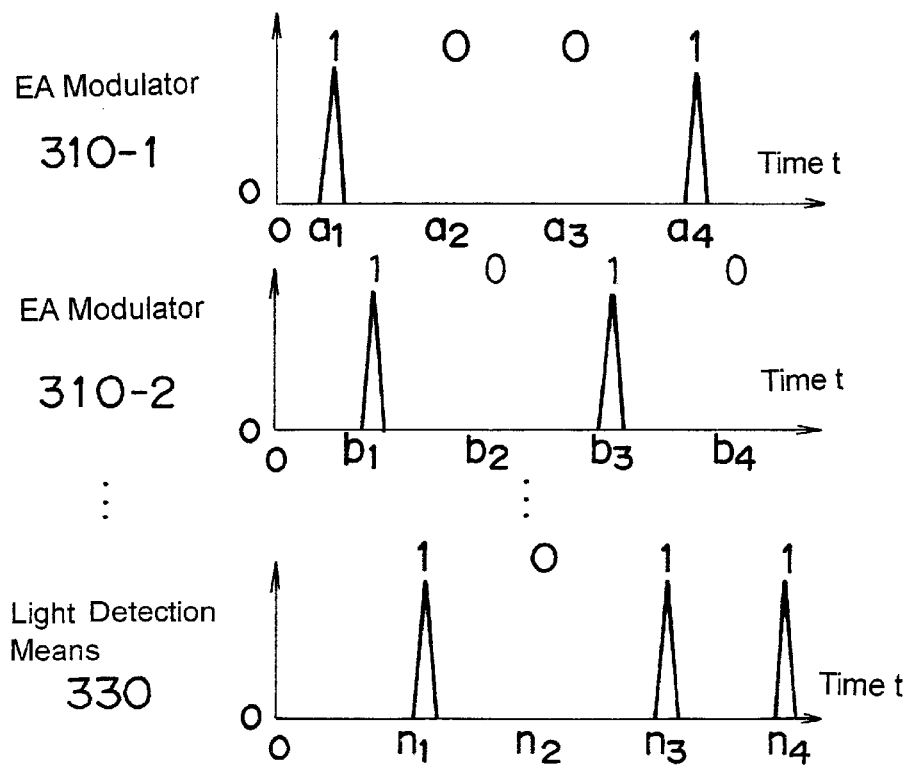

OPTICAL PROCESSOR USING ELECTRO-ABSORPTION TYPE OPTICAL MODULATORS

BACKGROUND OF THE INVENTION

The present invention relates to an optical processor.

At present, an optical processor capable of processing the highly multiplexed optical signal is required as one of indispensable elements for successfully constructing a future ultra-high speed optical communication system having a large capacity. In the circumstances like this, an optical gate device reported to the IEEE by M. Suzuki et al might be deemed useful for complying with the above requirement. Their report entitled "New Applications of a Sinusoidally Driven InGaAsP Electro-absorption Modulator to In-line Optical Gates with ASE Noise Reduction Effect," was published by IEEE, J. Light Wave Technol., 1992, vol. 10, No. 12, pp. 1912–1918.

In the optical gate device disclosed by the above report, there is used an electro-absorption modulator (referred to as "EA modulator" hereinafter) as an optical gate means capable of absorbing and modulating the light of a wavelength used in the optical communication system. The EA modulator has such an optical transmission characteristic that in the vicinity of zero volt, the optical transmission rate does not show any change with respect to the forward voltage applied to the EA modulator but it shows a monotonous decrease in respect of the reverse voltage applied to the same.

In the prior art optical gate device described in the above report, the voltage which is made by superimposing the sinusoidal voltage of a certain repetitive frequency on the DC biased voltage, is applied to the EA modulator in the vicinity of zero volt, thereby attaining such an optical transmission characteristic that the optical transmission rate changes along a rectangular waveform. In the optical gate device of the above report, demultiplexing of RZ (return-to-zero) optical pulse signal is carried out such that the timing of the maximum peak ("mountain top") of the sinusoidal voltage is synchronized with the timing of the signal train taken out as the optical output.

According to the above report, as the RZ signal train formed by alternately multiplexing the RZ signal of a bit rate of Gbit/s with respect to the time axis, is given to the EA modulator which is sinusoidally driven at the repetitive or repetition frequency of 5, GHz, every other RZ signal of 5, Gbit/s is extracted from the RZ signal train passing through the EA modulator, thereby enabling another RZ signal train formed of the remaining (i.e. not extracted) RZ signals to be extracted. This way of using the optical gate device is specially referred to as "optical demultiplexing." Also, the alternately multiplexing means the time-division multiplexing of the signal trains belonging to different series.

As explained above, the greatest feature of the optical gate device discussed in the above report is that the optical gate waveform of a rectangular shape can be formed with ease by applying the sinusoidal voltage to an EA modulator. Furthermore, the other feature of the above optical gate device is that the sinusoidal voltage is externally applied to the EA modulator, so that it is possible to make the period of the optical gate waveform variable, and thus different from the mode synchronization method. Still further, the other feature of the above optical gate device is that it is not always needed for the feeder line to have a wide-band characteristic as the modulation voltage is the sinusoidal one.

However, some problems to be solved are still left in the demuliplexing system or the optical gate system, which employs the above-mentioned optical gate device. Thus, those will be discussed in the following.

(1) First Problem

The first problem is that the optical demultiplexing system wherein the signal is extracted every other signal from the signal train alternately multiplexed with respect to the time axis, is not only less efficient in making use of the optical energy but also tends to increase the power consumption by the system and to enlarge the system scale as well.

In the optical demultiplexing system employing the above optical gate device, the alternately multiplexed signal train is branched into two parallel branches before executing the optical demultiplexing operation. Then, signals are extracted every other signal from the first signal train of the one branch, and the similar extraction is performed on the second signal train of the other branch. At this time, the phase of the second sinal train is shifted by a half period with respect to the first one. Therefore, this system comes to waste a half of the optical energy, thus being less efficient in making use of the optical energy.

In this case, still further, in order that the optical signal train can hold the same optical power for the sensitivity of the corresponding receiver before and after being processed by the optical demultiplexing, the optical power of the alternately multiplexed signal train has to be doubled by amplifying it at a certain stage either before or after the signal train being branched into two parallel branches. As a result, the power consumption and the scale of the system can not help being increased.

In association with the above first problem, when the above prior art optical gate device processes the optical signal train that is multiplexed with a multiplex factor of n (n: integer), it will encounter the following two significant problems.

One problem that exists is that it can not be expected that the operation of the EA modulator will be stable over a long period of time. In the optical demultiplexing operation of the alternately multiplexed signal train, the DC bias voltage is generally set in the vicinity of the OFF-state region. However, when the signal train is n-multiplexed, the DC bias voltage has to be deeply set in the OFF-state region. Consequently, while the high frequency voltage is deflected toward the negative side, there is applied to the EA modulator the resultant large negative bias voltage obtained as a sum of the DC bias voltage and the high frequency amplitude voltage. As the result of this, the light absorption at the end face for receiving the incident light on the EA modulator is exponentially increased, so that there is a high possibility that the element breaks down and it becomes difficult to expect the stable operation of the EA modulator over a long period of time.

The other problem exists in that the amount $(n-1)/n$ of the energy of the input optical signal is unavoidably wasted. In order to remove this problem thus far, the optical signal power has to be amplified to be n times as much as that of the incident light at a certain stage either before or after the signal train is branched into parallel branches of n. As a result, the power consumption and the scale of the system can not help being increased.

(2) Second Problem

The second problem is that in the demuliplexing system or the optical gate system employing the above prior art optical gate device, the gate width (time duration) can be changed only in a narrow range. The ratio of the gate width and inverse value of the repetitive frequency is generally called a duty ratio or cycle. In the gate system employing the above optical gate device, an obtainable duty ratio is in the range of utmost 0% through. 60%. In order to obtain the duty ratio of 60% or more, it is needed to set the DC bias voltage as a large positive voltage or to make the amplitude of the high frequency voltage zero volt and set the DC bias voltage as zero volt or more.

However, if the DC bias voltage exceeds the built-in voltage of the pin junction in the EA modulator, the abrupt current begins to flow, which causes the heat generation at the pin junction, spotaneous light emission, absorption of free carriers, etc. On the other hand, in order to make the amplitude of the high frequency voltage zero, it is need to additionally provide a new electric circuit therefor.

The present invention has been made in view of the above described and other problems in connection with the prior art optical gate device and other optical processors.

SUMMARY OF THE INVENTION

According to the invention, in order to solve the problems as described above, there is provided a novel and improved optical processor which includes: one optical modulator of the electro-absorption type or two or more optical modulators of the same type which are optically connected in series with each other; at least one voltage generation means which is electrically connected with the one or more optical modulators and generates the modulation voltage to be supplied to the one or more optical modulators; and at least one electric current detection means which is electrically connected with the one or more optical modulators and detects the extinction current or the light absorption current generated by the optical modulator.

In the above optical processor, the voltage generation means drives the optical modulator with the modulation voltage generated thereby. The optical modulator can absorb and modulate the input light in response to the modulation voltage. The electric current detection means can detect the extinction current which is generated in the optical modulator at the time of absorbing and modulating the input light. In other words, according to the above structure, it becomes possible to execute both of the strength modulation and the detection of the input light.

Optical connection in the above optical processor can be achieved, for instance by means of optical cascade arrangement of optical elements thereof, integrating them on an identical substrate, a simple optical alignment and so on. The optical cascade arrangement is a kind of method for making the optical connection used in case of packaging elements to an optical module. For instance, according to this method, each core of optical waveguides of tow or more optical elements are connected with each other by using an optical transmission means such as an optical fiber or a planar lightwave circuit (referred to as "PLC" hereinafter), thereby forming an optical passage. In case of integrating two or more optical elements on an identical substrate, they are connected with each other through an optical waveguide used in common or are coupled with a directional optical coupler intervening therebetween. Furthermore, in case of simply aligning two or more optical elements, they are coupled with each other by means of an optical coupler such as a lens, so that their optical axes are arranged so as to meet each other.

The optical processor according to the invention may further includes at least one relay means which relays the electrical connection between the voltage generation means and the optical modulator and also the electrical connection between the electric current detection means and the optical modulator, and which supplies the modulation voltage generated by the voltage generation means, to the optical modulator and at the same time, supplies the extinction current generated in the optical modulator to the electric current detection means.

The above relay controls the direction of supplying the modulation voltage and the extinction current. Thus, it is possible to minimize or remove the effect of the modulation voltage to the electric current detection means, and also as the effect of the extinction current to the voltage generation means.

The above relay means may be constructed in the form of an electric circulator or a filter acting on the wavelength of the electric signal. Furthermore, it is preferable that the optical modulator has a triode structure. The triode structure is defined as the waveguide structure of an optical element which is formed by crystallographically joining two semiconductor regions of the identical conductive type through one semiconductor region of the opposite conductive type together. The triode structure is explained in detail in JP unexamined patent publications (KOKAI) Nos. 9, (1997)-301301, and 10, (1998)-030477, in the names of the inventors of this patent application, which are herein incorporated by reference.

As described in the above two publications, when adopting the triode structure as the waveguide structure for the optical elements, the range of driving voltage can be made far wider compared with that of the waveguide structure using a pn or pin junction (referred to as "diode structure" hereinafter). Therefore, the optical modulator including the triode structure can have a large degree of freedom and an excellent controllability with respect to the modulating operation. For instance, in the case of applying the superimposed voltage formed of the bias voltage and the sinusoidal voltage to the optical modulator having the triode structure, the bias voltage can be deeply set while the amplitude of the sinusoidal voltage can be set widely, so that the duty ratio of the modulating operation by the optical modulator can be controlled in the range of 0, through 100%.

Furthermore, according to the invention, in order to solve the problems as described above, there is further provided a novel and improved optical processor which includes: one optical modulator of the electro-absorption type or two or more optical modulators of the same type which are optically connected in series with each other, any of the optical modulators having a triode structure; and at least one voltage generation means which is electrically connected with the one or more optical modulators and generates the modulation voltage to be supplied to the one or more optical modulators. Thus, there is provided the optical processor having the function as an optical gate which makes use of the optical modulator with the triode structure showing the excellent controllability in respect to the operation.

Still further, according to the invention, in order to solve the problems as described above, there is further provided a novel and improved optical processor wherein the optical signal can be extracted from a time-division multiplexed optical signal train at a predetermined time interval and the other optical signal can be added to that optical signal train at the same time interval, the optical processor including one optical modulator of the electro-absorption type or two or more optical modulators of the same type which are optically connected in series with each other, all of the optical modulators having a triode structure and extracting the optical signal. Thus, there is provided the optical processor having an optical add/drop function which makes use of the optical modulator with the triode structure which shows the excellent controllability in respect of the operation.

The triode structure of the optical modulator may includes a pinip junction or an nipin junction, and a pinp junction or an nipn junction.

In the optical processor according to the invention, there may be further provided a light detection means which is optically connected with the last stage of a sequence of said optical modulators. With the structure like this, the optical processor comes to have a light receiving function capable of receiving the input light by means of both of the optical modulator and the light detection means.

In the optical processor having two or more optical modulators according to the invention, the operation timing of respective optical modulators can be set to be different from one another. With the structure like this, the optical processor comes to be able to perform desired processing such as modulating, gating, or detection of the time-division multiplexed optical signal on the basis of the time-division channel thereof.

The optical processor according to the invention can include two or more optical modulators and further includes a means for adjusting the operation timing of modulators, which shifts the operation timing of one optical modulator from that of the other.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings which illustrate preferred embodiments wherein:

FIGS. 11a thr. 11e shows results attained through experiments carried out with respect to the invention;

FIGS. 14a, 15a; 15b, 15c; & 16a, 16b, are diagrams for explaining the operation of the optical processor shown in FIG. 12 when it is used in one and the other ways;

DETAILED DESCRIPTION OF THE PREFERRED EMBODIMENTS

Figure 1:
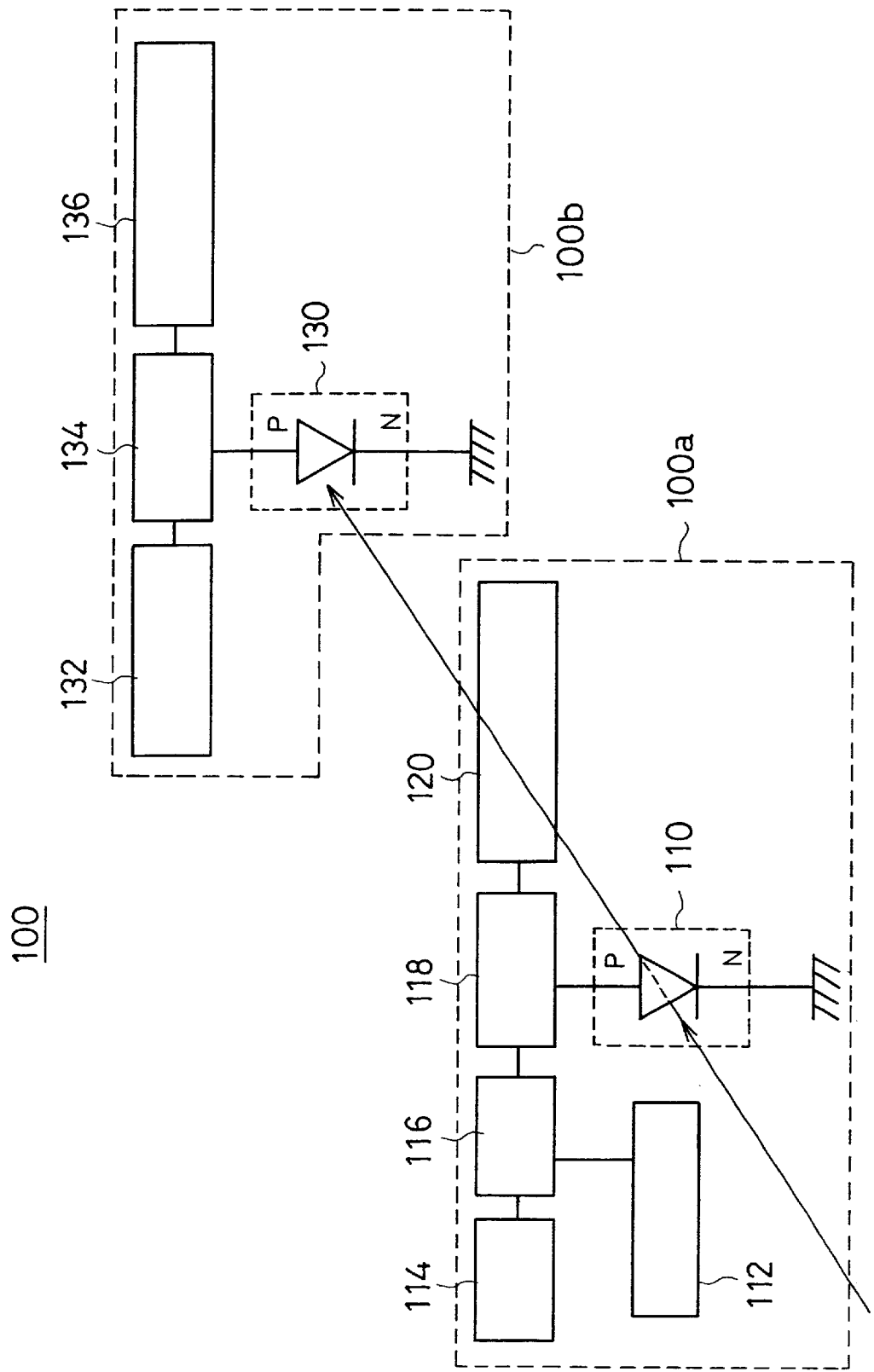
FIG. 1 is a block diagram for explaining the basic structure of an optical processor to which the invention is applicable.

Several preferred embodiments of the invention will now be described in detail in the following with reference to accompanying drawings. In the following descriptions and drawings, the components of the invention having the identical function and structure are designated with identical reference numerals or marks, in order to avoid redundant repetition of description.

(First Embodiment)

The first embodiment of the invention will now be described with reference to FIGS. 1 through 4. As has been briefly described above, FIG. 1 is a block diagram for explaining the basic structure of an optical processor 100 according to the invention, and FIG. 2 is a schematic illustration for explaining the outline of the structure of an optical receiver 150 as an example of the optical processor 100. FIGS. 3 and 4 are diagrams for explaining the operation of the optical processor 100 when it is used in one and the other ways.

Figure 2:
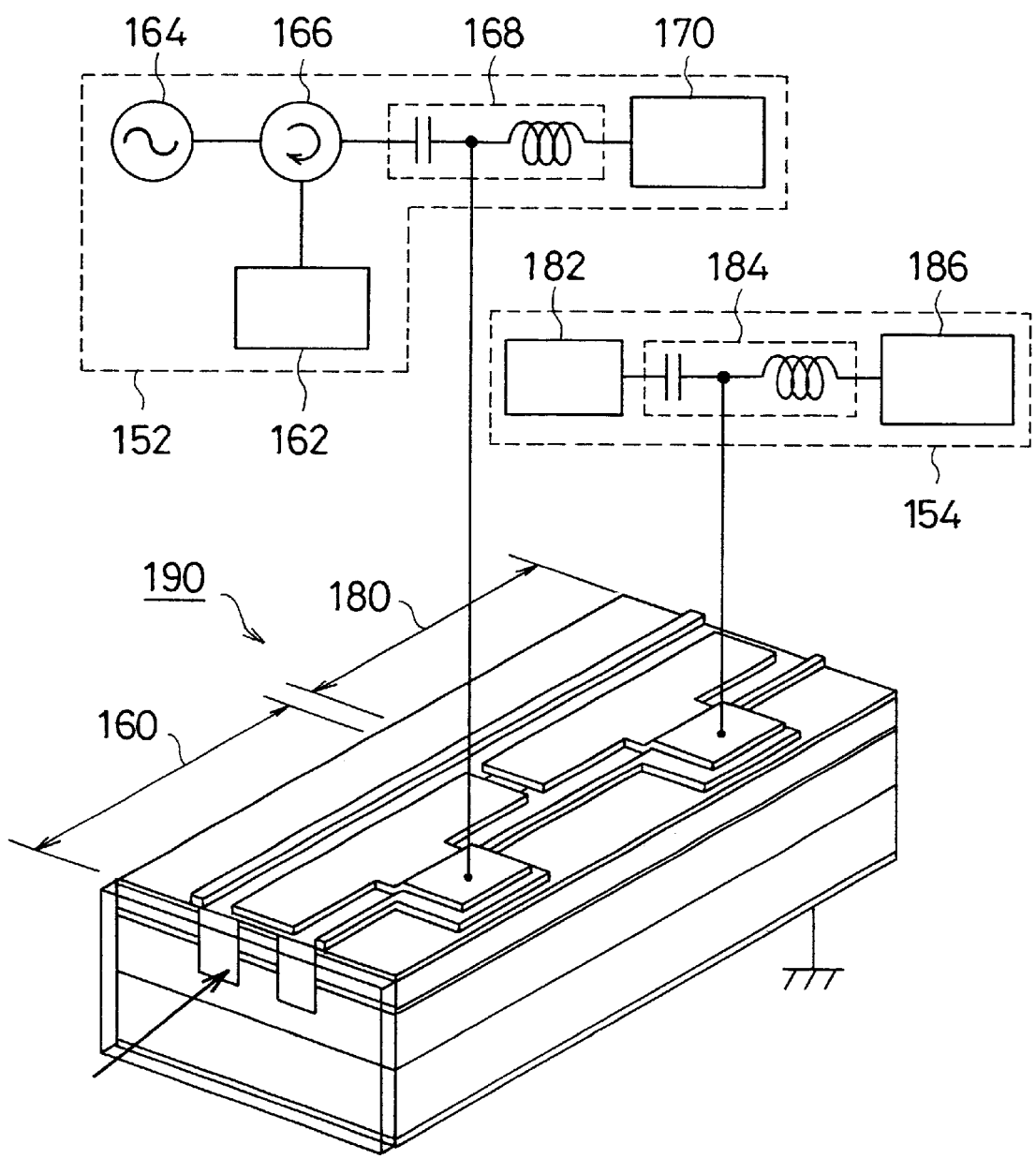
FIG. 2 is a schematic representation for explaining the structure of an example of the optical processor shown in FIG. 1.

Now, referring to FIG. 1, the optical processor 100 according to the invention consists of two units, that is, the first optical processing unit 100a, and the second optical processing unit 100b. An EA modulator 110 (discussed later) of the first optical processing units 100a, and a light detection means 130 (discussed later) of the second optical processing units 100b, are optically connected with each other. Consequently, in the optical processor 100, there is formed an optical passage in which optical waveguides for both of an EA modulator 110 and the light detection means 130 are arranged in series.

The optical connection between the EA modulator 110 and the light detection means 130 can be set up, for instance by optical cascade arrangement making use of optical fibers or PLC's and, if needed, additionally making use of optical connectors and other optical parts. It is also possible to set up the optical connection between the EA modulator 110 and the light detection means 130, for instance by integrating them on an identical semiconductor substrate such that they may have an optical waveguide in common.

The first optical processing unit 100a, includes the EA modulator 110 having a diode structure and grounding one electrode thereof, the second relay 118 connected with the other electrode of the EA modulator 110, the first relay 116 and a bias voltage generator 120, both of which are individually connected with the second relay 118, thereby being electrically connected with the EA modulator 110 through the second relay 118, respectively, and the first electric signal processing device 112 and a sinusoidal voltage generator 114, both of which are individually connected with the first relay 116, thereby being electrically connected with the EA modulator 110 through the first and second relays 116 and 118.

In the optical processing unit 100a, the EA modulator 110 modulates the input light in response to the modulation voltage supplied thereto and generates the extinction current. The sinusoidal voltage generator 114 corresponding to a voltage generation means generates the sinusoidal voltage of a predetermined frequency corresponding to the modulation voltage. The first electric signal processing device 112 corresponding to a current detection means detects and processes the extinction current generated by the EA modulator 110 and determines the quantity of the input light absorbed by the EA modulator 110 based on the above detected extinction current. The bias voltage generator 120 generates the bias voltage supplied to the EA modulator 110.

Furthermore, in the first optical processing unit 100*a*, the second relay 118 superimposes the sinusoidal voltage supplied by the sinusoidal generator 114 through the first relay 116, on the bias voltage supplied by the bias voltage generator 120, and then supplies the superimposed voltages to the EA modulator 110. At the same time, this second relay 118 supplies the extinction current generated by the EA modulator 110 to the first relay 116. This first relay 116 supplies the sinusoidal voltage generated by the sinusoidal voltage generator 114 to the EA modulator 110 through the second relay 118, and at the same time, supplies the extinction current coming from the EA modulator 110 through the second relay 118, to the first electric signal processing device 112.

The second optical processing unit 100*b*, includes a light detection means 130 having a diode structure and grounding one electrode thereof, the third relay 134 connected with the other electrode of the light detection means 130, the second electric signal processing device 132 and a DC voltage source 136, both of which are independently connected with the third relay 134, thereby being electrically connected with the light detection means 130 through the third relay 134, respectively.

In the second optical processing unit 100*b*, the light detection means 130 converts the input light into the extinction current by way of photoelectric conversion. The DC voltage source 136 generates the DC voltage as the driving voltage supplied to the light detection means 130. The second electric signal processing device 132 detects and processes the extinction current, thereby determining the quantity of the input light inputted to the light detection means 130 after passing through the EA modulator 110. The third rely 134 supplies the DC voltage from the DC voltage source 136 to the light detection means 130 while it also supplies the extinction current generated by the light detection means 130 to the second electric signal processing device 132.

In the optical processor 100 according to the present embodiment, there may be included other structural elements than the described above. For instance, an impedance matching element such as a terminating set of 50 Ω, may be connected in parallel with the EA modulator 110. In this case, the impedance matching element plays a role of taking the impedance matching such that the sinusoidal voltage is efficiently applied to the EA modulator 110.

Furthermore, in the optical processor 100 including such an impedance matching element, it may be possible to serially connect a condenser having a pertinent capacity with the impedance matching element. In this case, the condenser plays a role of cutting the DC current component flowing through the impedance matching element due to the DC voltage biasing the EA modulator 110.

Still further, in the optical processor 100, the light detection means 130 may be a photodiode, an EA modulator, etc. for instance. The first and second electric signal processing devices 112 and 132 may be an electric signal processing device, a decoder, etc., for instance. The first relay 116 may be an electric circulator, a wavelength filter for electric signals, etc., for instance.

In case of employing the wavelength filter of the electric signal as the first relay 116 in the optical processor 100, only the high frequency current or the beat of a predetermined frequency can be detected and processed at the electric signal processing device 112 as described in the following (a) and (b). Needless to say, the wavelength can be expressed as the reciprocal of the frequency, thus the frequency filter can be used as the first relay 116 just the same as the wavelength filter.

(a) The high frequency voltage of a frequency f0 generated by the sinusoidal voltage generator 114 is applied to the EA modulator 110 through the first and second relays 116 and 118. On one hand, the current component having a predetermined frequency f1 in the high frequency current generated due to the light absorption by the EA modulator 110, is extracted through the second relay 118 and the first relay 116 and is inputted to the first electric signal processing device 112.

(b) The high frequency voltage of a frequency f0 generated by the sinusoidal voltage generator 114 is inputted to the EA modulator 110 through the first and second relays 116 and 118. On one hand, the high frequency current (including the current component of a frequency f0+Δf1/f0−Δf1) generated due to the light absorption by the EA modulator 110, is inputted to the first relay 116 via the second relay 118.

Then, only the beat component Δf1 is extracted at the first relay 116, and the extracted beat component Δf1 is inputted to the first electric signal processing device 112.

In the optical processing unit 100*a*, of the optical processor 100 as arranged above, it is possible to carry out a variety of optical processings such as intensity modulation, optical gate processing, coding, or optical demultiplexing, by utilizing the ability of light absorption and modulation of the EA modulator. At the same time, in the first optical processing unit 100*a*, light detection, signal detection, or generation of electric signals varying at a predetermined period, etc., can be carried out by making use of the photoelectric conversion by the EA modulator 110 and the detection of the extinction current by the first electric signal processing device 112.

The optical processing executed by the first optical processing unit 100*a*, as described above is applicable to various input light such as continuous light, laser light, optical pulses (optical bright pulses, optical dark pulses), or multiplex optical signals used in various systems (e.g. time-division system, wavelength-division system, alternating multiplex system). The optical processing carried out by the first optical processing unit 100*a*, as described above can be controlled with ease by adjusting the sinusoidal voltage generated by the sinusoidal voltage generator 114 and the bias voltage generated by the bias voltage generator 120.

On one hand, in the second optical processing unit 100*b*, light detection, signal detection, or generation of electric signals varying at a predetermined period, can be carried out by making use of the photoelectric conversion by the light detection means 130 and the extinction current detection by the second electric signal processing device 132. Similar to the case of the first optical processing unit 100*a*, the optical processing executed by the second optical processing unit 100*b*, is applicable to various kinds of input light such as continuous light, laser light, optical pulses (optical bright pulses, optical dark pulses), or multiplex optical signals used in various systems (e.g. time-division system, wavelength-division system, alternating multiplex system). The optical processing carried out by the second optical processing unit 100b, can be controlled with ease by adjusting the DC voltage of the DC voltage source 136.

Accordingly, with the optical processor 100 according to the present embodiment, more various kinds of optical processes can be executed by combining the optical processings by the first and second optical processing units 100a, and 100b. For instance, in the optical processor 100, it becomes possible to receive the multiplexed optical signal of the alternating multiplex system without branching it in parallel. For instance, it becomes possible to receive the multiplexed optical signal having such a speed that is twice as high as the operational speed limit of the light detection means 130 of the second optical processing unit 100b. Further, it becomes possible to apply the photoelectric conversion to the optical signal coded by the first optical processing unit 100a, through the second optical processing unit 100b, thereby forming the electric signal.

Here, let us explain about a concrete example of the application of the optical processor 100. In this example, the detection of the time-division double multiplexed optical signal (i.e. multiplex factor: 2) by the optical processor 100, will be described referring to FIGS. 3 and 4. In this example, the first optical processing unit 100a, is used as an optical gate receiving device (device having functions as both of an optical gate and an optical receiver). On one hand, the second optical processing unit 100b, is used as an optical receiver.

Figure 3A:
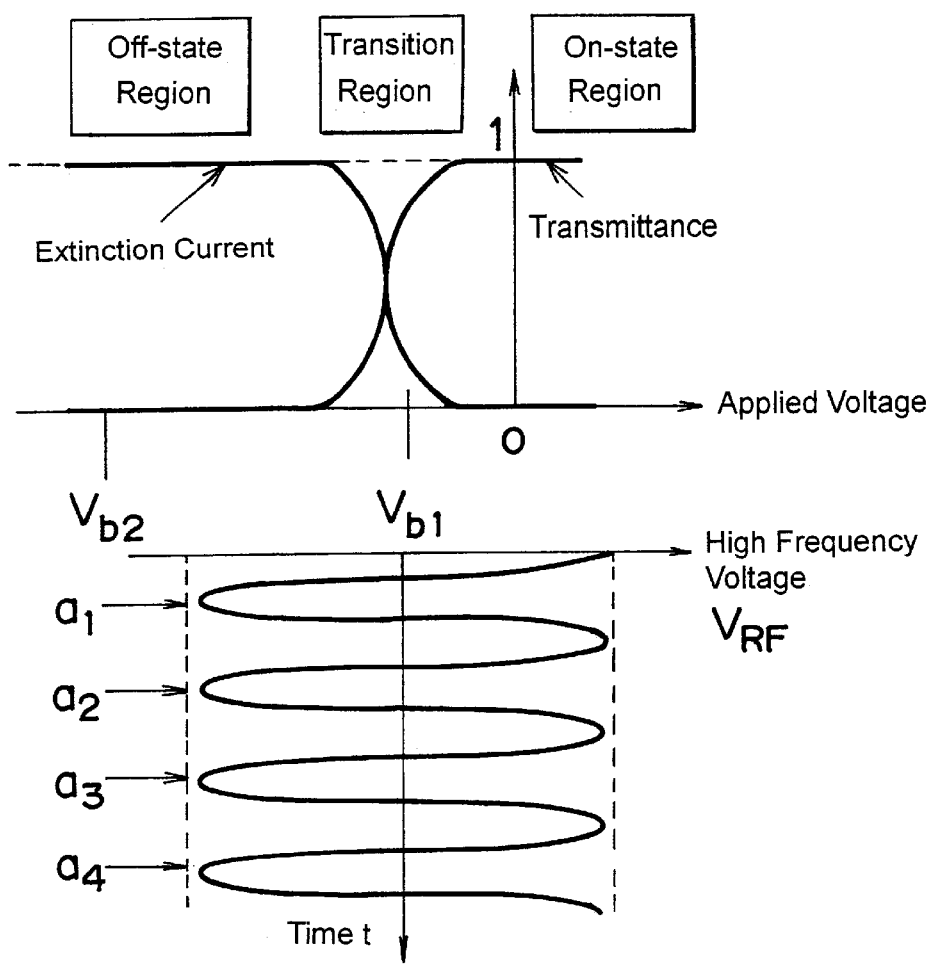
FIGS. 3a, 3b, & 4a, 4b, are diagrams for explaining the operation of the optical processor shown in FIG. 1 when it is used in one and the other ways.
Figure 3B:
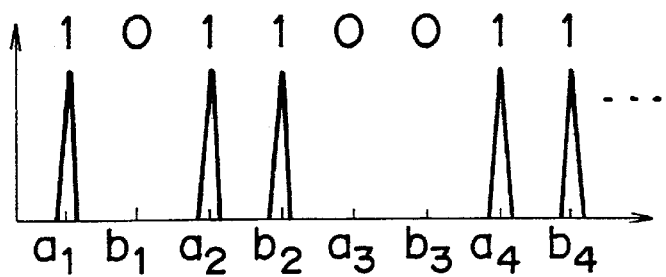

FIGS. 3a, and 3b, are diagrams showing the change of the transmittance and the normalized extinction current for the applied voltage to the EA modulator 110 (pin junction type), and setting of the voltage to be applied to the EA modulator. Normally, the EA modulator 110 is extinguished as the reverse bias voltage is applied thereto. In the following description, the state where the transmittance is "1", is referred to as the ON-state region while the state where the transmittance is "0", is referred to as the OFF-state region. The state between the above two is also referred to as the transition region.

On one hand, the change of the extinction current is just equal to the change obtained by inverting the change of the transmittance up side down. That is, as the optical power level is in the OFF-state region, the extinction current becomes "1" (i.e. ON-state of the extinction current) while as the optical power level is in the ON-state region, the extinction current becomes "0" (i.e. OFF-state of the extinction current).

Figure 4A:
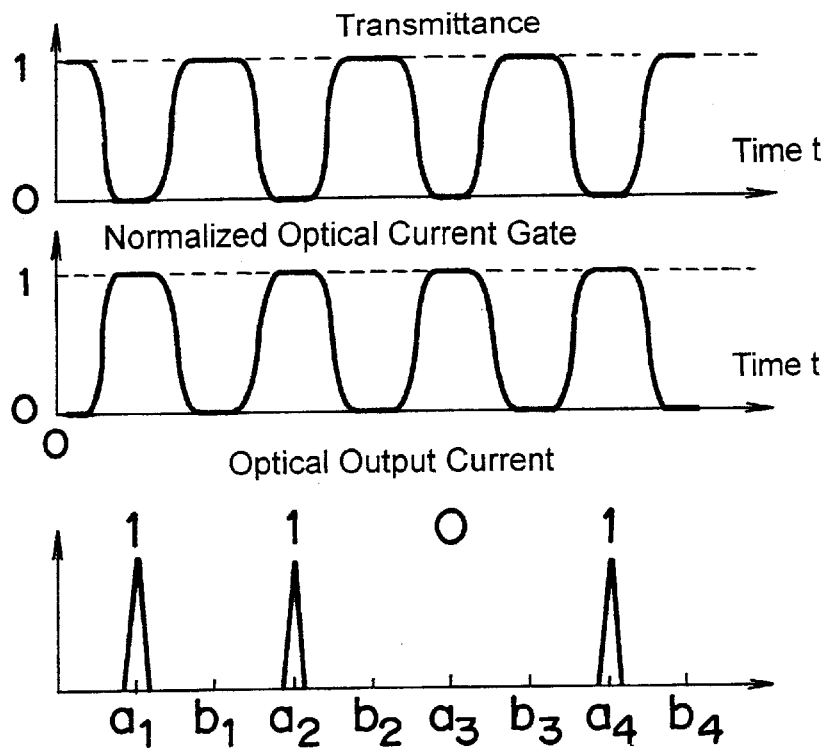

Then, when letting the high frequency sinusoidal voltage be applied to the EA modulator 110 such that each minimum peak (so-called "valley") of the high frequency sinusoidal voltage meets each of the first optical pulse signal series (i.e. a1, a2, a3, a4 . . . of the input optical signal shown in FIG. 3b) of the time-division double multiplexed optical signal, the EA modulator 110 comes to generate the current pulse signals a1, a2, a3, a4 . . . =1, 1, 0, 1, . . . as shown in FIG. 4a.

These current pulse signals generated by the EA modulator 110 flow to the electric signal processing device 112 via the second relay 118 and the first relay 116 as well, and are received and processed there. Namely, the first optical processing unit 100a, performs two processings, that is, demultiplexing and receiving the first optical pulse signal series of the time-division double multiplexed optical signal. The signal processing operation like this is referred to as "optical signal processing by optical current gating" hereinafter.

In case of performing the optical signal processing by optical current gating in the EA modulator 100, it is desirable that the amplitude VRF of the high frequency voltage and the DC bias voltage Vb1 are set such that both of the ON- state region and the OFF-state region have an approximately same width (time duration), in other words, the duty ratio of optical current gating becomes about 50%.

With the above processing, the component of the time-division double multiplexed optical signal passing through the EA modulator 110, comes to includes only the second optical pulse signal series (i.e. b1, b2, b3, b4 . . . of the input optical signal shown in FIG. 3b). This means that the second optical pulse signal series has received the processing by "transmittance gate" through the EA modulator 110.

Figure 4B:
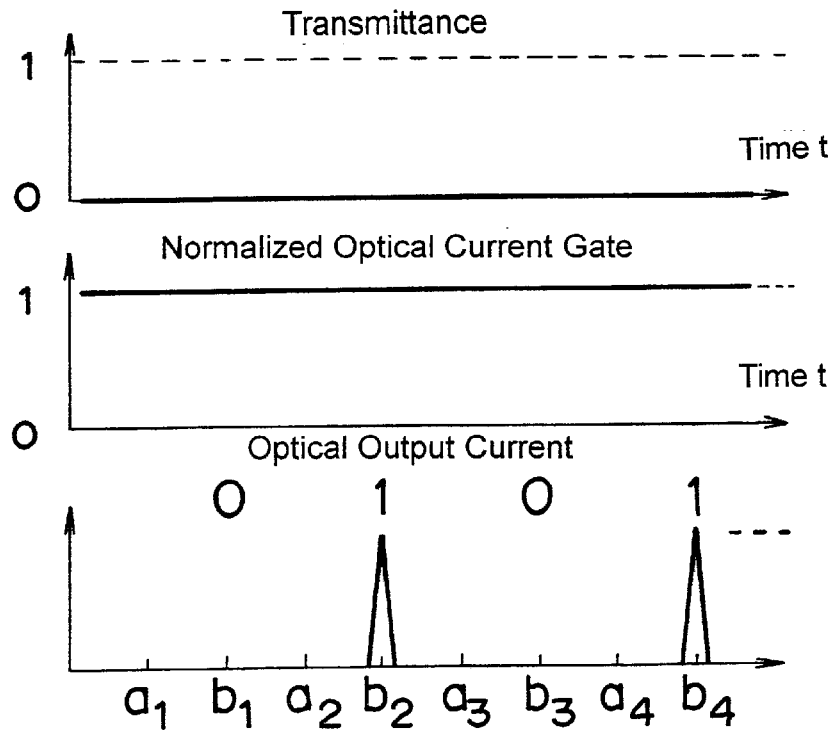

Consequently, the optical signal inputted to the second optical processing unit 100b, is already processed to have a bit rate which is enough to be received by the light detection means 130. As the result of this, as shown in FIG. 4b, the current pulse signals b1, b2, b3, b4 . . . 0, 1, 0, 1 . . . can be received and processed by only applying the DC reverse bias voltage Vb2 to the light detection means 130. In the example of the application as described above, it is desirable that the DC voltage Vb2 is set such that the transmittance of the input light to the light detection means 130 is completely in the OFF-state region.

In the next, an structural example of the above optical processor 100 will now be more concretely described with reference to an optical signal receiver 150 shown in FIG. 2, which is applicable to the above application example i.e. the detection of the time-division double multiplexed optical signal. As will be seen from FIG. 2, the optical signal receiver 150 includes an integrated optical element 190 which is provided with an EA modulator region 160 and a light receiving region 180, the first electric circuit 152 for driving the EA modulator region 160, and the second electric circuit 154 for driving the light receiving region 180.

In the integrated optical element 190, the EA modulator region 160 corresponding to the EA modulator 110 (FIG. 1) and the light receiving region 180 corresponding to the light detection means 130 (FIG. 1), are formed so as to be integrated on an identical substrate such that they have an optical waveguide in common. In the integrated optical element 190, there are formed a lower electrode which is used in common by both of the EA modulator region 160 and the light receiving region 180, an upper electrode for use in the EA modulator region 160, and another upper electrode for use in the light receiving region 180. In the optical signal receiver 150, the lower electrode of the integrated optical element 190 is grounded. In the integrated optical element 190 described above, the optical waveguide arranged between the EA modulator region 160 and the light receiving region 180, plays a role of optically connecting both regions with each other, and at the same time, plays a role of electrically isolating both of them from each other.

In the optical signal receiver 150, the first electric circuit 152 includes the first bias transducer 168 connected with the upper electrode of the EA modulator region 160, an electric circulator 166 and the first DC voltage source 170, both of which are independently connected with the first bias transducer 168, respectively, and the first electric signal reproducing device 162 and a high frequency voltage generator 164, both of which are independently connected with the electric circulator 166, respectively.

The high frequency voltage generator 164 corresponds to the sinusoidal voltage generator 114 of the optical processor 100 indicated in FIG. 1. In the optical signal receiver 150, the period of the optical signal processing operation by optical current gating of the EA modulator region 160 can be controlled by adjusting the period of the high frequency voltage generated by the high frequency voltage generator 164. The DC voltage source 170 corresponds to the bias voltage generator 120 of the optical processor 100 shown in FIG. 1. In the optical signal receiver 150, the gate waveform of the EA modulator region 160 can be controlled by adjusting the value of the DC voltage generated by the DC voltage source 170.

The first electric signal reproducing device 162 corresponds to the first electric signal processing device 112 of the optical processor 100 shown in FIG. 1. The extinction current generated in the EA modulator region 160 is detected and processed by the first electric signal reproducing device 162, thereby enabling the modulator region 160 to receive the input optical signal.

The first bias transducer 168 corresponds to the second relay 118 of the optical processor 100 shown in FIG. 1, and it includes a condenser (high frequency port side) connected with the electric circulator 166, a coil (low frequency port side) connected with the DC voltage source 170, and a node through which the coil and the condenser are connected with the EA modulator region 160. The first bias transducer 168 multiplexes the high frequency voltage from the high frequency voltage generator 164 and the DC voltage from the DC voltage source 150, and supplies the multiplexed voltage to the EA modulator region 160. And at the same time, the first bias transducer 168 supplies the extinction current generated by the EA modulator region 160 to the electric circulator 166.

The electric circulator 166 corresponds to the first relay 116 of the optical processor 100 shown in FIG. 1. This electric circulator 166 supplies the high frequency voltage generated by the high frequency voltage generator 164 to the first bias transducer 168, and at the same time, it supplies the extinction current to the first electric signal reproducing device 162, the extinction current being supplied from the EA modulator region 160 through the first bias transducer 168.

In the optical signal receiver 150, the second electric circuit 154 includes the second bias transducer 184 connected with the upper electrode of the light receiving region 180, the second electric signal reproducing device 182, and the second DC voltage source 186, both of which are independently connected with the second bias transducer 184, respectively.

The second electric signal reproducing device 182 corresponds to the second electric signal processing device 132 of the optical processor 100 shown in FIG. 1, and has the almost same structure and function as the first electrical signal reproducing device 168 in the first electric circuit 152. The extinction current generated by the light receiving region 180 is detected and processed by the second electric signal reproducing device 182, thereby enabling the light receiving region 180 to receive the input optical signal.

The second DC voltage source 186 corresponds to the DC voltage source 136 of the optical processor 100 shown in FIG. 1, and has the almost same structure and function as the first DC voltage source 170 in the first electric circuit 152. The optical signal receiving operation of the integrated optical element 190 can be controlled by adjusting the DC voltage generated by the second DC voltage source 186.

The second bias transducer 184 corresponds to the third relay 134 of the optical processor 100 shown in FIG. 1, and has the almost same structure and function as the first bias transducer 168 in the first electric circuit 152. The second bias transducer 184 supplies the DC voltage generated by the second DC voltage source 186 to the light receiving region 180, and supplies the extinction current generated by the integrated optical element 190 to the second electric signal reproducing device 182.

According to the first embodiment, in the above application example of the optical processor 100, i.e. optical demultiplexing and receiving operation of the time-division double multiplexed optical signal, even the electrical current that is generated in the optical modulator region 160 during the optical current gating operation, can be used for the detection, so that the energy of the input optical signal can be received without wasting it, thus enhancing efficiency of energy utilization.

Furthermore, according to the present embodiment, in the demultiplexing and receiving operation of the time-division double multiplexed optical signal, even if the time-division double multiplexed optical signal is the alternating multiplexed signal, there is no need for those signal trains to be divided into two parallel branches before executing optical current gating operation. Consequently, there is no need to prepare any amplifier circuit for compensating the power loss caused by branching those signal trains in parallel, thus enabling the power consumption and the scale of the entire optical processor to be reduced. That is, according to the present embodiment, there can be solved the first problem related to the optical demultiplexing and receiving system employing the prior art optical gate device for processing the time-division double multiplexed optical signal.

As a result, according to the present embodiment of the invention, there are provided the optical current gating method and the light-to-current conversion method which are applicable to the future ultra-high speed optical communication and the processing of the ultra-high speed optical signal, especially the optical current gating method and light-to-current conversion method for processing the time-division multiplexed optical signal, and the optical processor which can execute these methods.

(Second Embodiment)

Figure 5A:
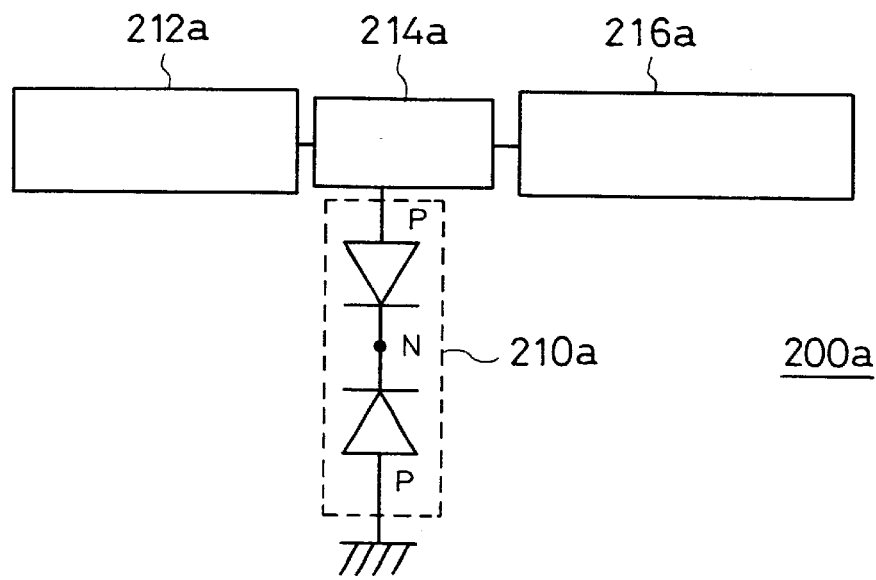
FIGS. 5a, 5b, are block diagrams for explaining the basic structure of another optical processor to which the invention is applicable.
Figure 5B:
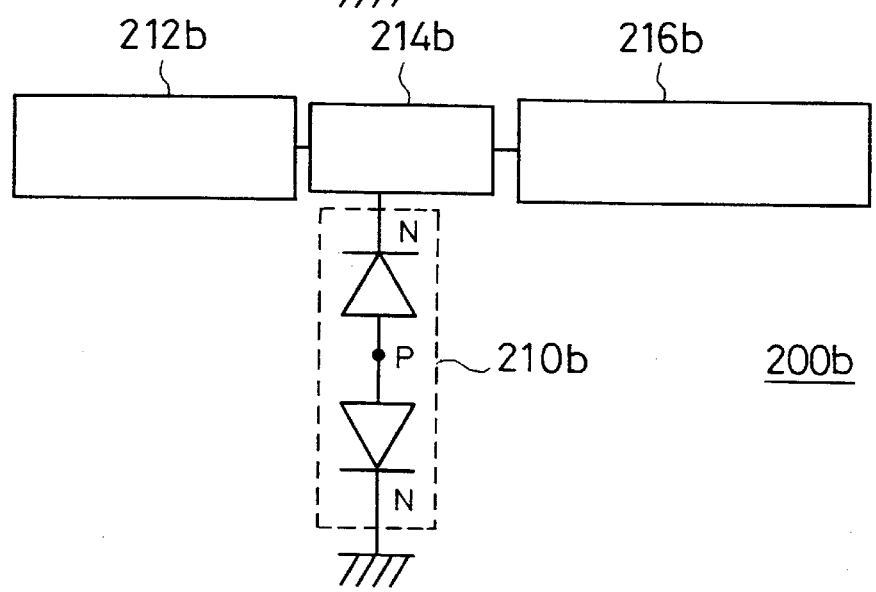
Figure 6:
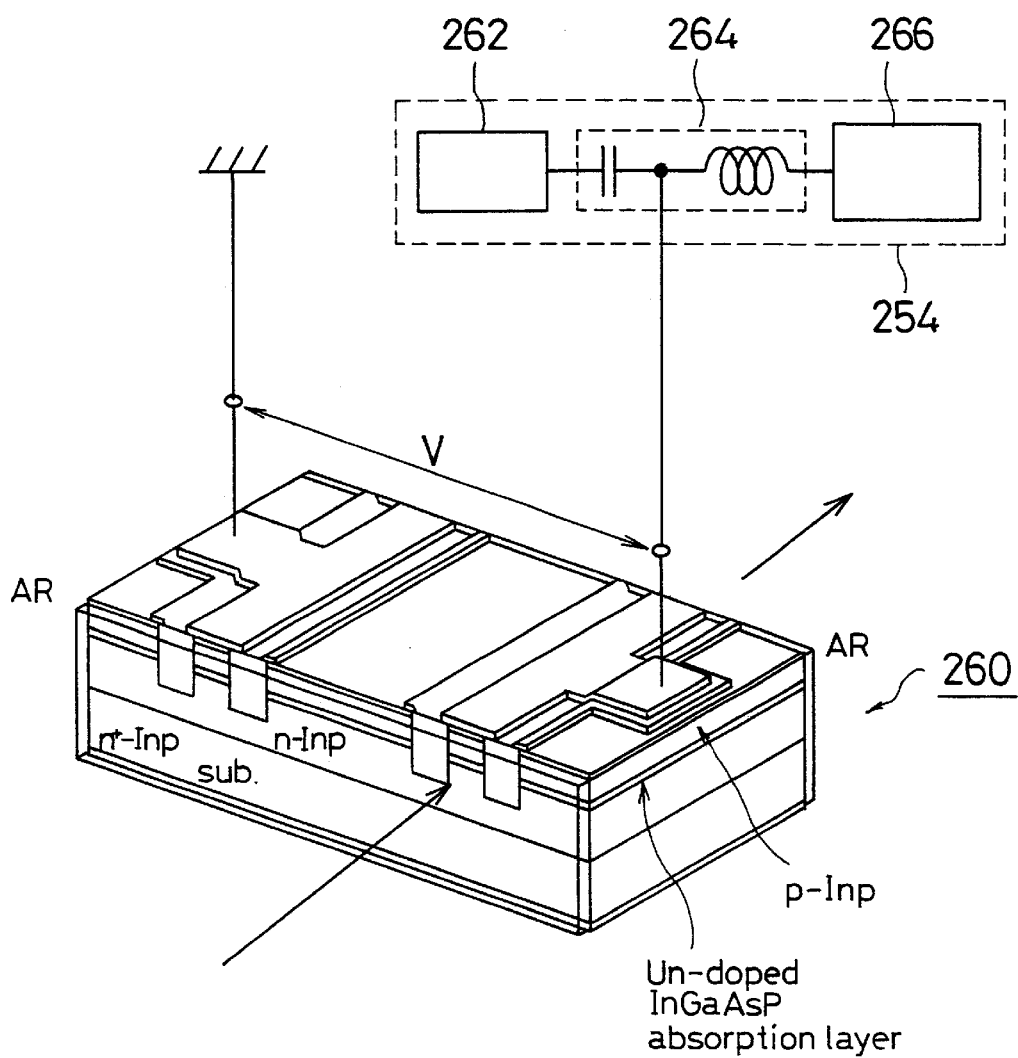
FIG. 6 is a schematic representation for explaining the structure of an example of the optical processor in FIG. 5.
Figure 7:
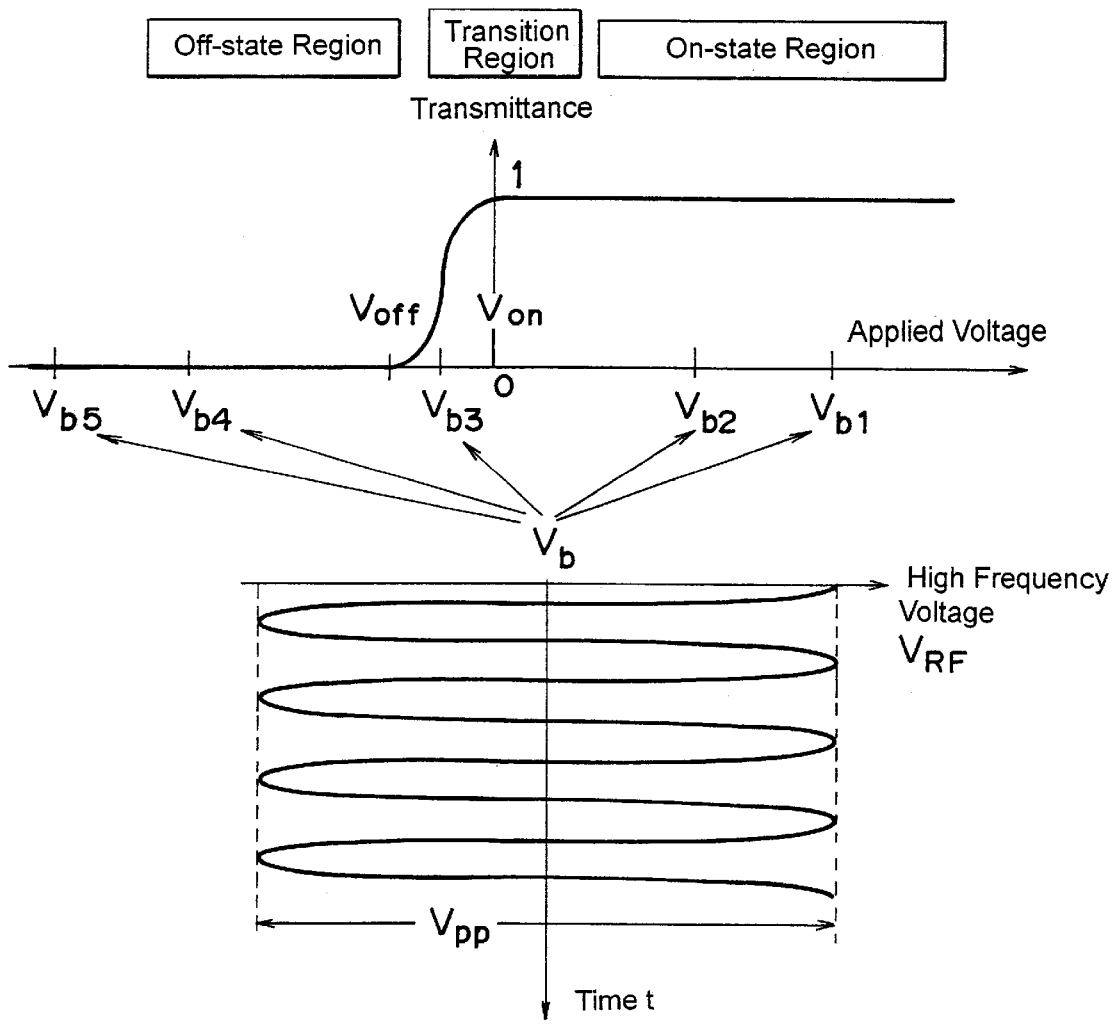
FIGS. 7 and 8 are diagrams for explaining the operation of the optical processor shown in FIG. 5 when it is used in one and the other ways.
Figure 8:
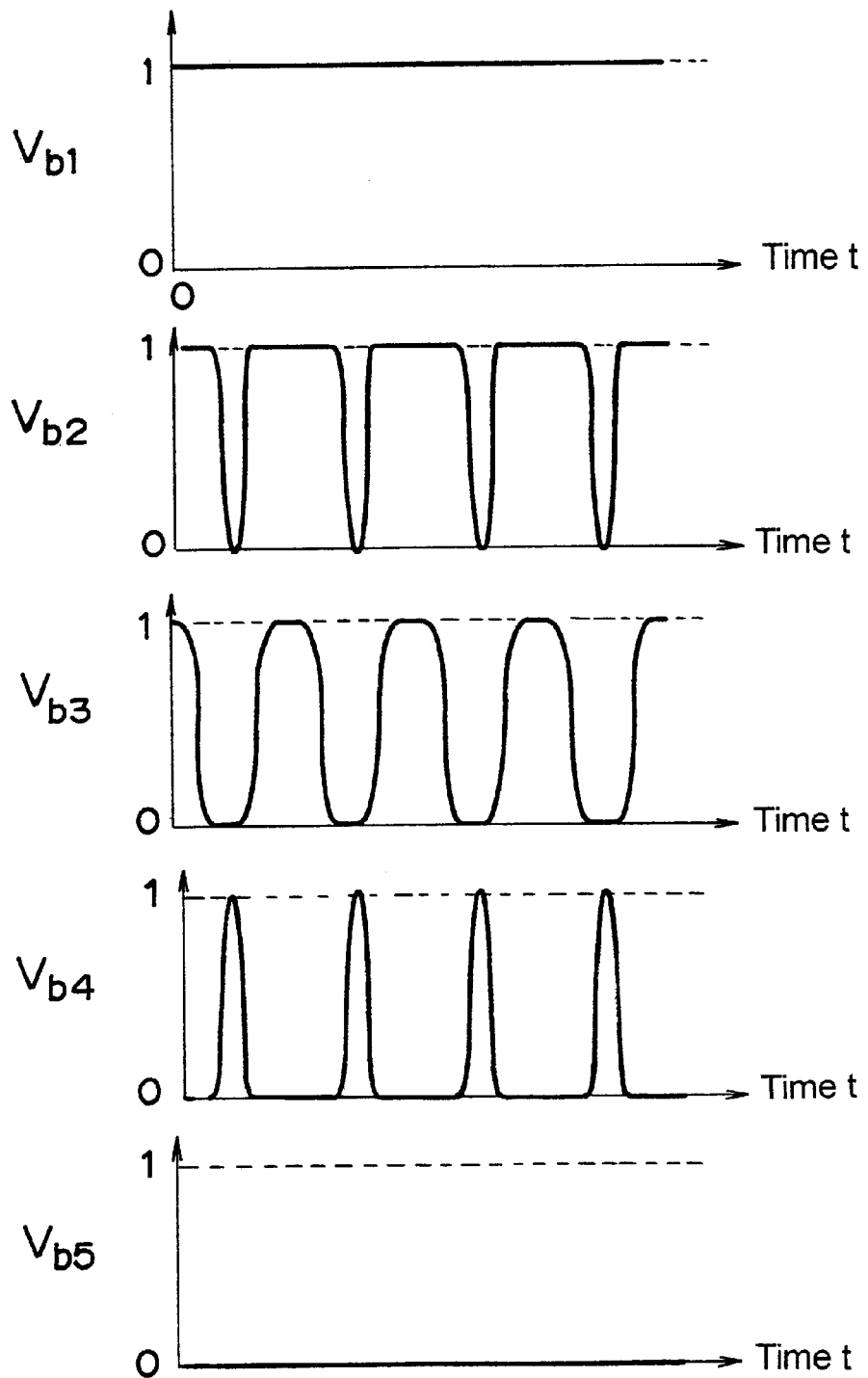
Figure 9:
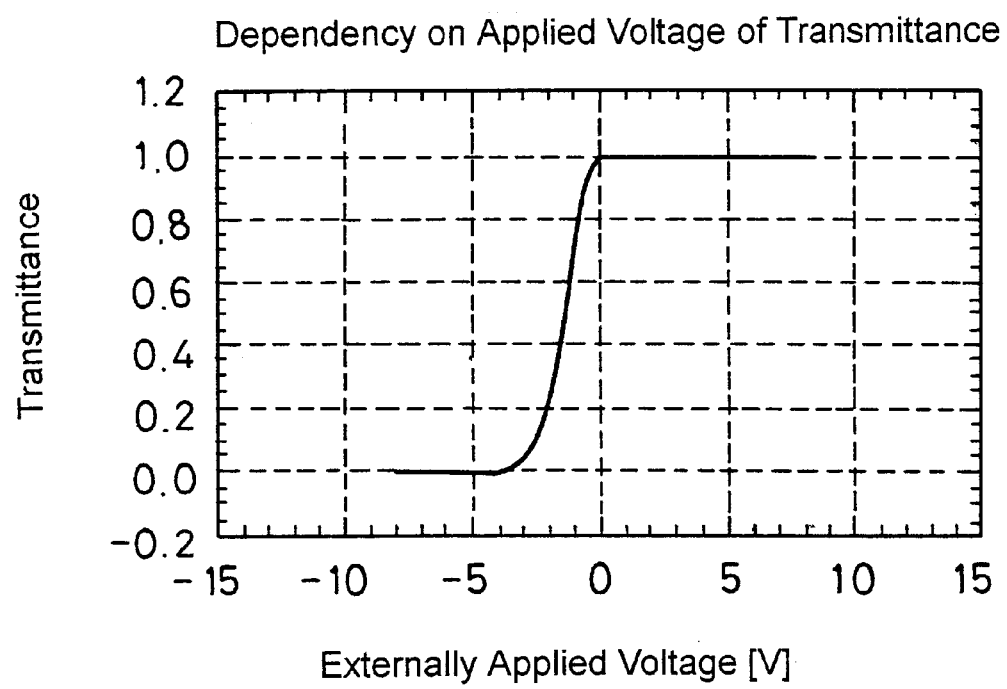
FIG. 9 is a curve for explaining the characteristic of an optical modulator which can be used for the optical processor shown in FIG. 5.
Figure 10:
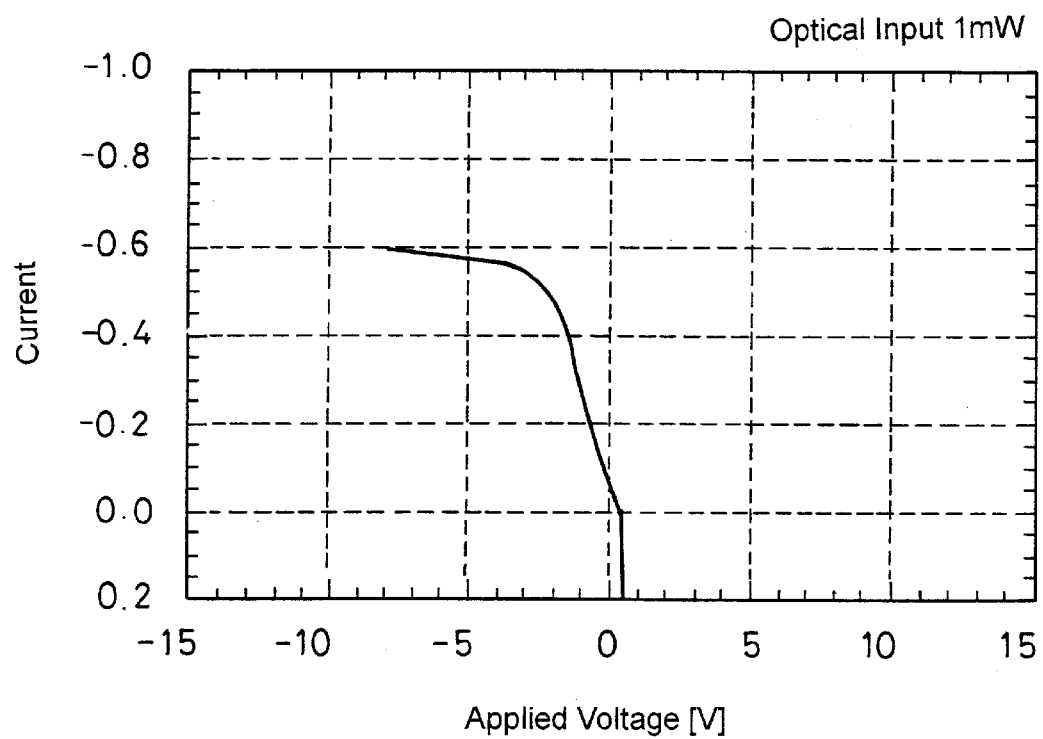
FIG. 10 is a curve for explaining the characteristic of an optical modulator which can be used for the optical processor shown in FIG. 1.

Next, the second embodiment of the invention will be described with reference to FIGS. 5 through 11. Here, FIGS. 5a and 5b, are block diagrams for explaining the basic structure of an optical processors 200a, and 200b, according to the second embodiment of the invention; FIG. 6 is a diagram for explaining the outline of the structure of an optical gating device 250 as an example of the optical processor 200a; FIGS. 7 and 8 are diagrams for explaining the operation of the application example of the optical processor 200a; FIGS. 9 and 10 are graphs for explaining the characteristic curves of an optical modulator applicable to the present embodiment; and FIGS. 11a, through 11e, show results attained through experiments performed with respect to the present embodiment.

As shown in FIG. 5a, the optical processor 200a, includes an EA modulator 210a, having a triode structure and grounding one electrode thereof, a relay 214a, connected with the other electrode of the EA modulator 210a, a sinusoidal voltage generator 212a, and a bias voltage generator 216a, both of which are independently connected with the relay 214a, thereby being electrically connected with the EA modulator 210a, through the relay 214a, respectively.

In the optical processor 200a, according to the second embodiment, the EA modulator 210a, modulates the input light in response to the modulation voltage supplied thereto. The EA modulator 210a, includes a pinp semiconductor junction or a pinip semiconductor junction as a structural element for forming its basic structure. To be more concrete, the EA modulator 210a, has the basic structure wherein an EA modulator having the pin junction and a semiconductor element having the np junction or the nip junction are connected in a hybrid fashion. This hybrid-connected EA modulator 210a, functions as a transmittance gate. In such transmittance gate operation of the EA modulator 210a, the extinction current is generated by the EA modulator. However, such extinction current is not made use of in this embodiment.

The sinusoidal voltage generator 212a, corresponding to the voltage generation means generates the sinusoidal voltage of a predetermined frequency corresponding to the modulation voltage. The bias voltage generator 216a, generates the bias voltage to be supplied to the EA modulator 210a. The relay 214a, superimposes the sinusoidal voltage generated by the sinusoidal generator 212a, on the bias voltage generated by the bias voltage generator 216a, and then supplies the superimposed to the EA modulator 210a.

In the optical processor 200a, described above, there is used the EA modulator 210a, having the triode structure in the form of the pinip junction or pinp junction. However, the present embodiment should not be limited by such structure. As shown in FIG. 5b, the present embodiment may be applicable to another optical processor 200b, using an EA modulator 210b, having a triode structure which includes an nipin junction or nipn junction.

Other structural elements of the optical processor 200b, shown in FIG. 5b, have the almost same structure and functions as corresponding elements of the optical processor 200a, as shown in FIG. 5a. That is, sinusoidal voltage generators 212a, and 212b, relays 214a, and 214b, and bias voltage generator 216a, and 216b, have almost identical structures and functions, respectively.

In the following, the present embodiment will be explained mainly by ways of the optical processor 200a, referring to the accompanying drawings related thereto. Needless to say, such explanation is applicable to the optical processor 200b, as it is.

In the optical processor 200a, explained above, an impedance matching element such as a terminating set of 50, Ωmay be connected in parallel with the EA modulator 210a. In this case, the impedance matching element plays a role of talking the impedance matching such that the sinusoidal voltage is efficiently applied to the EA modulator 210a.

Furthermore, in the optical processor 200a, including the impedance matching element, it may be possible to connect a condenser having a pertinent capacity in series with the impedance matching element. In this case, the condenser plays a role of cutting the DC current component flowing through the impedance matching element due to the bias voltage applied to the EA modulator 210a.

In the optical processor 200a, as constituted above, it is possible to carry out a variety of optical processings such as intensity modulation, optical current gating, coding, or optical demultiplexing, by utilizing the ability of extinction and modulation of the EA modulator 210a. The optical processing by the optical processor 200a, is applicable to various input light such as continuous light, laser light, optical pulses (optical bright pulses, optical dark pulses), or multiplex optical signals used in various systems (e.g. time-division system, wavelength-division system, alternating multiplex system).

Furthermore, the optical processing carried out by the optical processor 200a, can be controlled with ease by adjusting the sinusoidal voltage generated by the sinusoidal generator 212a, and the DC voltage generated by the bias voltage generator 216a.

In the next, the operation of the optical processor 200a, according to the present embodiment will be described with reference to FIGS. 7 through 11.

In the optical processor 200a, an external voltage is applied between the p—p electrodes of the pinp junction or pinip junction of the EA modulator 210a, (in case of the optical processor 200b, applied between the n—n electrodes of the nipn junction or the nipin junction of the EA modulator 210b).

FIGS. 7 and 8 are diagrams showing the transmittance change versus the externally applied voltage, and setting of the external voltage.

As shown in FIG. 7, the range of the voltage allowed to be applied to the EA modulator 210a, of the optical processor 200a, is largely enlarged in the forward direction comparing with the transmittance change of the EA modulator 110 shown in FIG. 3a. As the EA modulator 210a, has the triode structure, the ON-state level can be sufficiently maintained up to the considerably large forward voltage. The reason why the triode structure can have such a withstand voltage characteristic, is explained in detail in a JP patent application No. H9(1997)- 301301, and the same No. H10 (1998)-03477, which are incorporated herein by reference.

In the optical processor 200a, according to the present embodiment, the duty ratio of the gate can be adjusted in the range of 0% to 100% by suitably adjusting the bias voltage (generated by the bias voltage generator 216) and the amplitude of the high frequency voltage as the sinusoidal voltage (generated by the sinusoidal voltage generator 212a).

As will be understood from FIG. 7, the input optical signal shows the change as drawn in FIG. 8, where Von stands for the voltage at which the transmittance becomes almost 1, Voff the voltage at which the transmittance becomes almost 0, Vb the bias voltage, and VRF the amplitude of the high frequency voltage.

Namely, all the input optical signals are absorbed by the EA modulator 210a, (bias voltage Vb5 in FIGS. 7 and 8), under the condition:

$$Voff > Vb + VRF \tag{1}$$

On one hand, all the input optical signals transmits through the EA modulator 210a, (bias voltage Vb1 in FIGS. 7 and 8), under the condition:

$$Voff < Vb - VRF \tag{2}$$

On the other hand, with regard to the transmittance of the input optical signal at the EA modulator, the duty ratio of the transmittance gate can be continuously changed in the range of values of 0, to 1, (bias voltage Vb2 through. Vb4 in FIGS. 7 and 8), when the condition is between both represented by the above expressions (1) and (2).

FIG. 9 shows the extinction characteristic of an EA modulator which is actually made by the inventor such that it has the triode structure including a pinip junction. As will be seen in this figure, the EA modulator allows the ON- state to be attained in the wide voltage range of 0, to 8, volt. FIG. 10, shows the extinction characteristic of an EA modulator having a diode structure. In this EA modulator, the ON-state can be only maintained from 0, to at most 0.7, volt. Thus, it will be seen from FIG. 9 how the EA modulator having the triode structure can stay in the ON-state over the wide voltage range.

FIGS. 11a through 11e, show the results obtained by the experiments the inventer(s) carried out for confirmation with respect to the gate operation of the EA modulator having the extinction characteristic shown in FIG. 9. In these experiments, the inventor actually performed the gate operation over the RZ pulse trains, using the sinusoidal voltage having the amplitude of 8Vp—p.

FIGS. 11b and 11c, show the output optical waveforms under the condition that the bias voltage is set in the transition region of the extinction (Vb=−0.65V, 5GHz and Vb=−0.8V, 10GHz). FIG. 11b, indicates that the extinction of the optical pulse is caused every four pulses while FIG. 11c, indicates that the same is caused every other pulse. That is, speaking in terms of the duty ratio, the state of FIG. 11b, is equivalent to about 75% while that of FIG. 11c, is equivalent to about 50%.

FIGS. 11d and 11e, show the output optical waveforms under such a condition that the repetitive frequency of the sinusoidal voltage is 10GHz and 5GHz, respectively, and the bias voltage is set in the ON-state region (Vb=+4V). As will be seen from FIGS. 11d, and 11e, , all the pulses transmit through in both cases. Speaking in terms of the duty ratio, both states indicated in these figures are equivalent to about 100%.

From the above-mentioned experiments, the optical gating operation of the present embodiment has been confirmed with respect to the RZ optical signal. However, the present embodiment is not limited to the RZ optical signal. The optical processor 200a, according the present embodiment is also applicable to gating operation of other time-division multiplex optical signals in other formats, for instance NRZ (Non-return-to-Zero) optical signal, sub-carrier modulated optical signal and so forth.

In the next, an example of the structure of the optical processor 200 (200a, and 200b) having been explained so far, will now be more concretely described with reference to a gate device 250 shown in FIG. 6, of which the duty ratio is variable in the range of 0% to 100%. As shown FIG. 6, the gate device 250 includes an EA modulator 260 which has a triode structure with a pinip junction and grounds one of its upper electrodes, and an electric circuit 254 for driving the EA modulator 260.

The EA modulator 260 employed in the gate device 250 corresponds to the EA modulator 210a, of the optical processor 200a, shown in FIG. 5a. This EA modulator 260 may be manufactured by the following process.

That is, the manufacturing process includes the steps of: preparing a substrate made of n+-InP; forming a lower clad layer made of n-InP, an absorption layer made of un-doped InGaAsP, an upper clad layer made of p-InP such that those layers are piled up on the substrate in sequence in that order; applying the mesa etching to the above piled-up layers from the upper clad layer side, thereby forming at least two or more piled-up layer bodies which are substantially insulated from each other and include the upper clad layer and the absorption layer, respectively; filling up the side portions (the recess created by mesa etching) of the piled-up layer bodies with a pertinent material such as a polyimide resin; forming an upper electrode capable of making an ohmic contact with each upper clad layer of two piled-up layer bodies; and finally carrying out predetermined steps for finishing the product such as the step of forming the optical I/O end faces by making a cleavage fracture, the step of applying an antireflection film coating (AR film) to the optical I/O end faces and so on. With the above steps, there is provided an EA modulator in which one of two piled-up layer bodies can be used as an optical waveguide.

The electric circuit 254 employed in the gate device 250 includes a bias transducer 264 which is connected with the other upper electrode of the EA modulator 260, a high frequency voltage generator 262 and a DC voltage source 266, both of which are independently connected with the bias transducer 264, respectively.

In the electric circuit 254, the high frequency voltage generator 262 corresponds to the sinusoidal voltage generator 212a, of the optical processor 200a, shown in FIG. 5a, and also has the almost same structure and function as the high frequency voltage generator 164 shown in FIG. 2. The DC voltage source 266 corresponds to the bias voltage generator 216a, of the optical processor 200a, shown in FIG. 5a, and also has the almost same structure and function as the first DC voltage source 170 shown in FIG. 2. The bias transducer 264 corresponds to the relay 214a, of the optical processor 200a, shown in FIG. 5a, and has the almost same structure and function as the first bias transducer 168 shown in FIG. 2.

In the gate device 250 as constructed above, the EA modulator 260 is able to change the applied voltage in a wide range from a certain reverse bias voltage to a certain forward bias voltage, without causing any injection current. Thus, it is possible to largely change the depth of the DC bias voltage, so that the duty ratio of the transmittance gate operation can be adjusted in the range of 0% to 100%.

As discussed above, according to the second embodiment, the duty ratio of 0% to 100% can be obtained with ease by adjusting the DC bias voltage. Moreover, while the duty ratio is adjusted, that is, the DC bias voltage is varied, there occurs neither noise caused by the light emitted from the junction nor the power loss of the optical signal due to the power absorption by free carriers. Accordingly, the aforesaid second problem related to the prior art optical gate, can be solved by the second embodiment.

As a result, according to the present embodiment of the invention, there are provided the optical gating method and light-to-current conversion method applicable to the future ultra-high speed optical communication and the processing of the ultra-high speed optical signal, especially the optical gating method and light-to-current conversion method for processing the time-division multiplexed optical signal, and the optical processor which can execute these methods.

(Third Embodiment)

Figure 12:
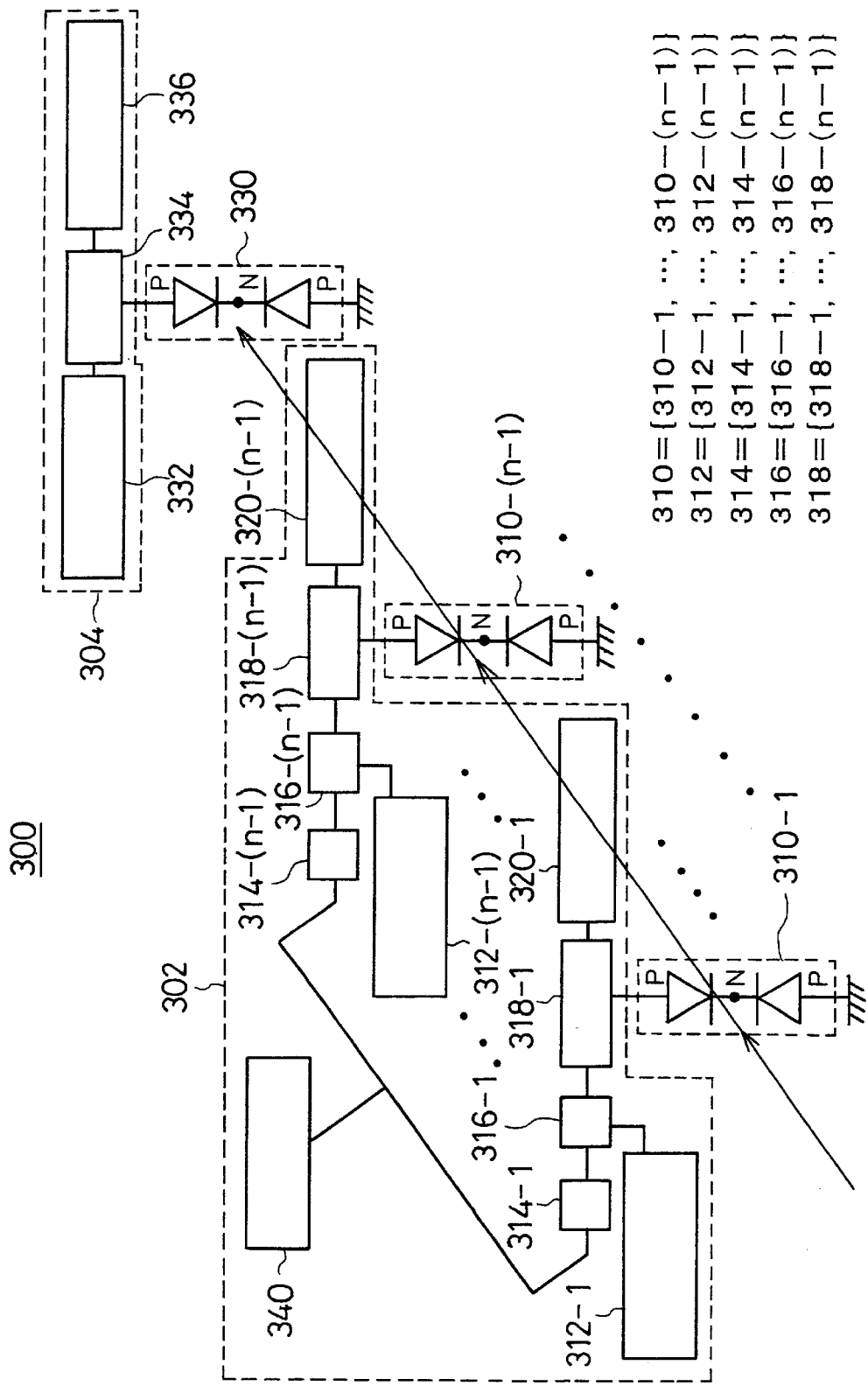
FIG. 12 is a block diagram for explaining the basic structure of still another optical processor to which the invention is applicable.
Figure 13:
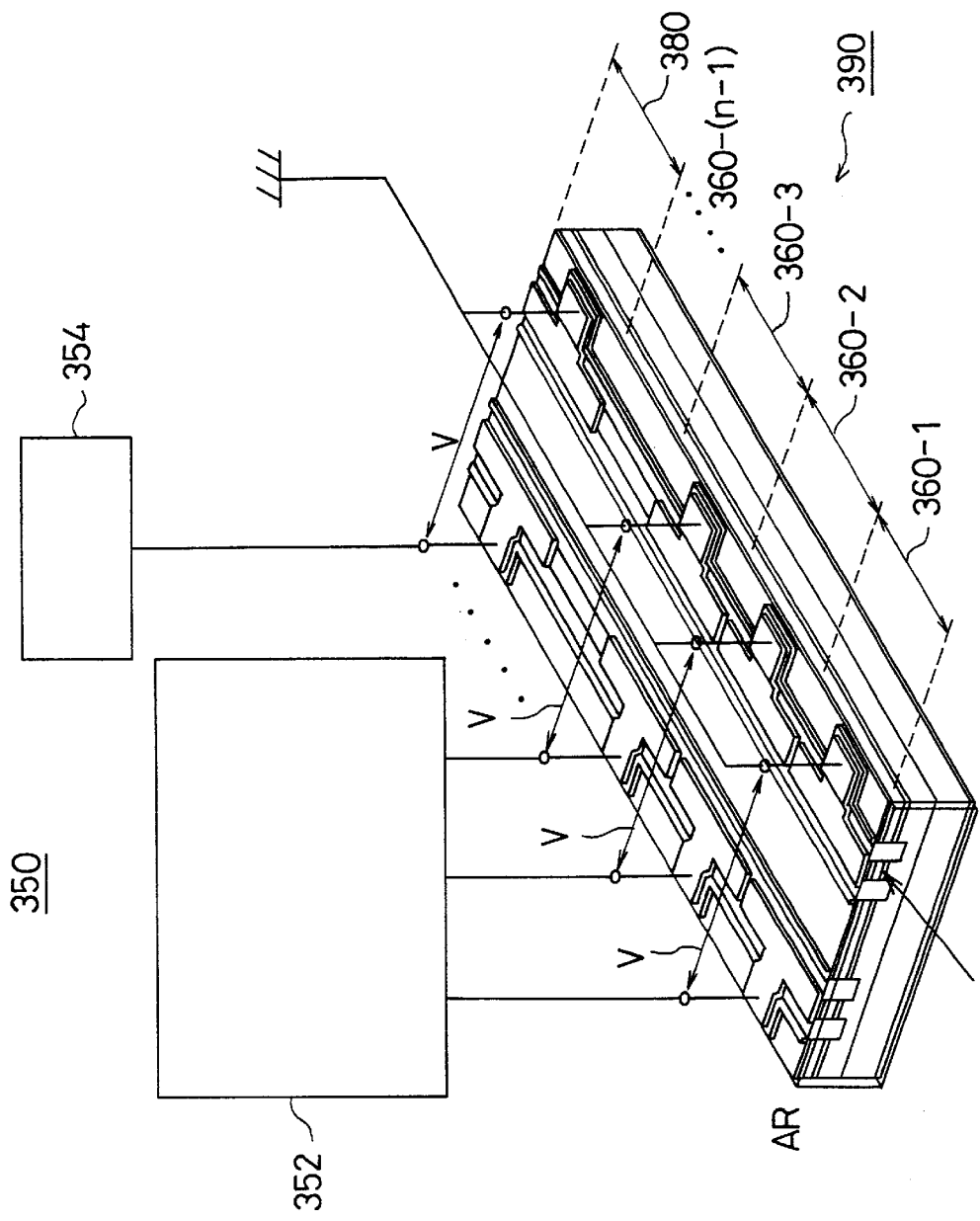
FIG. 13 is a schematic representation for explaining the structure of an example of the optical processor shown in FIG. 12.
Figure 14A:
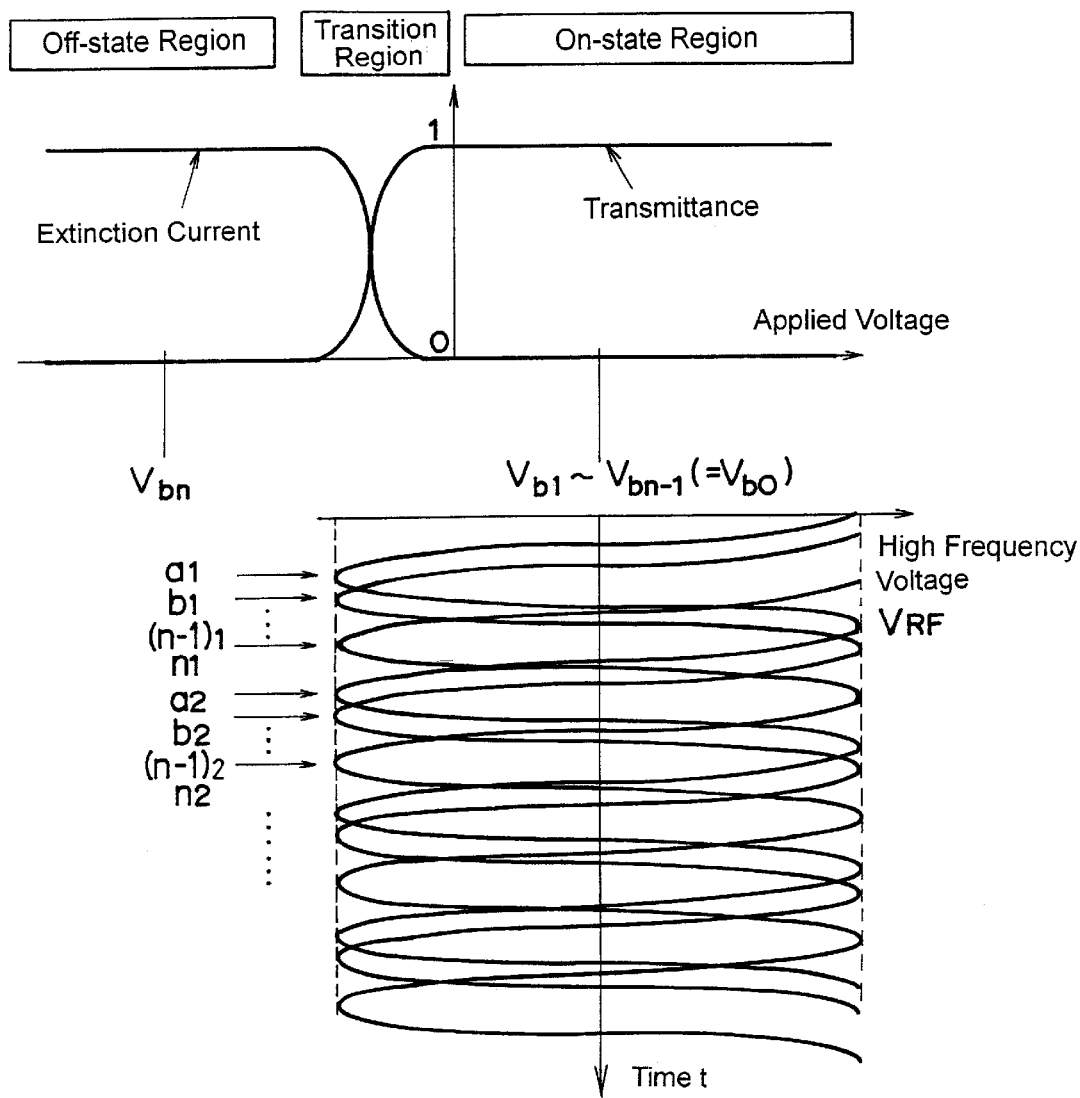
Figure 17:
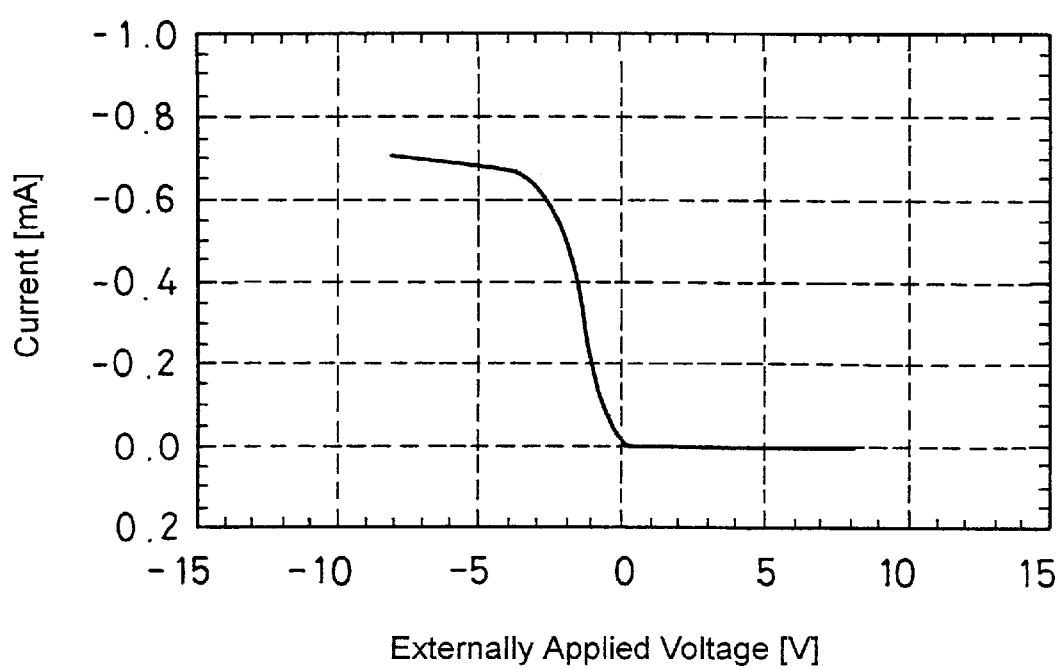
FIG. 17 is a curve for explaining the characteristic of an optical modulator which can be used for the optical processor shown in FIG. 12.

In the next, the third embodiment according to the invention will be described with reference to FIGS. 12 through 17. Here, FIG. 12 is a block diagram for explaining the basic structure of an optical processor 300 according to the third embodiment of the invention. FIG. 13 is a block diagram for explaining the outline of the structure of an optical receiver 350 as an example of the optical processor 300. FIGS. 14 through 16 are diagrams for explaining the operation of the application example of the optical processor 300. FIG. 17 is a graph for explaining the characteristic of an optical modulator applicable to the present embodiment.

As shown in FIG. 12, the optical processor 300 according to the third embodiment includes a plurality of EA modulators 310, n−1, (n: integer) in number, which are optically connected in series with one another, with the first electric circuit 302 connected with these EA modulators 310, with a light detection means 330 optically connected with the last stage of the series connected EA modulators, i.e., the EA modulator 310-(n−1), and with the second electric circuit 304 electrically connected with the light detection means 330. Furthermore, in the optical processor 300, there is provided an optical path which is formed by connecting in series the waveguides of EA modulators 310-1 through 310-(n−2) and light detection means 130.

Mutual optical connection of EA modulators 310 as well as the optical connection between the EA modulator 310-(n−1) and the light detection means 330 can be achieved for instance by optical cascade arrangement making use of optical fibers or PLC's and, if needed, additionally making use of optical connectors and other optical parts. It is also possible to attain the optical connection between the EA modulator 310-(n−1) and the light detection means 330 for instance by integrating them on an identical semiconductor substrate such that they have an optical waveguide in common.

The EA modulator 310 has a structure of the triode type including a pinp or a pinip junction and has the almost same structure and function as the EA modulator 210*a*, shown in FIG. 5*a*. One electrode of the EA modulator 310 is grounded while the other electrode is connected with each of the corresponding second relays (described later) of the first electric circuit 302. FIG. 17 shows the optical current characteristic of an EA modulator which can be used as the EA modulator 310.

The first electric circuit 302 employed in the optical processor 300 includes the first electric signal processing devices 312 of (n−1) as an electric current detection means, sinusoidal voltage generators 314 of (n−1) as a voltage generation means, the first relays 316 of (n−1) as a relay means, the second relays 318 of (n−1), bias voltage generators 320, and a phase control device 340 corresponding to an operation timing adjustment means.

The second relay 318 has the almost same structure and function as the second relay 118 shown in FIG. 1. In the first electric circuit 302, the second relay 318 is electrically connected with the other electrode of each of corresponding EA modulators 310.

The bias voltage generator 320 has the almost same structure and function as the second relay 118 shown in FIG. 1 while the first relay 316 has the almost same structure and function as the first relay 116 shown in FIG. 1. In the first electric circuit 302, the bias voltage generator 320 and the first relay 316 are independently connected with each of corresponding seconds relays 318, respectively, thereby being electrically connected with each of corresponding EA modulators 310 via each of corresponding second relays 318.

The first electric signal processing device 312 has the almost same structure and function as the first electric signal processing device 112 shown in FIG. 1 while the sinusoidal voltage generator 314 has the almost same structure and function as the sinusoidal voltage generator 114 shown in FIG. 1. In the first electric circuit 302, the first electric signal processing device 312 and the sinusoidal voltage generator 314 are independently connected with each of corresponding first relays 316, thereby being electrically connected with each of corresponding EA modulators 310 via each of corresponding first and second relays 316 and 318.

The phase controller 340 is connected with all of the sinusoidal voltage generators 314 of (n−1). The phase controller 340 controls the operation timing of the sinusoidal voltage generator 314, e.g., 314-1 and 314 such that the sinusoidal voltage generated one after another is provided with a preset phase difference. In the optical processor 300, the timing of the modulating operation by EA modulators 310-1 through 310-(n−1) is adjusted by using such phase difference as set and controlled by the phase controller 340.

The light detection means 330 applicable to the optical processor 300 is a light detection means having a semiconductor triode structure including a pinp junction or a pinip junction, and has the almost same structure as the EA modulator 210 shown in FIG. 5. One electrode of this light detection means 330 is grounded while the other is connected with the third relay 334 (described later) of the second electric circuit 304.

The second electric circuit 304 applicable to the optical processor 300 includes the third relay 334, the second electric signal processor 332 and a DC voltage source 336.

The second electric signal processor 332 and the DC voltage source 336 are independently connected with the third relay 334, thereby being electrically connected with the light detection means 330 through the third relay 334.

The second electric signal processing device 332 has the almost same structure and function as the second electric signal processing device 132 shown in FIG. 1. In the optical processor 300, the inputted light detection by the light detection means 330 is realized through the step of detecting and processing the extinction current by the second electric signal processing device 332.

The DC voltage source 336 has the almost same structure and function as the DC voltage source 136 shown in FIG. 1. In the optical processor 300, the DC voltage generated by the DC voltage generator is applied to the light detection means 330, thereby it being driven.

The third relay 334 has the almost same structure and function as the third relay 134 shown in FIG. 1. In the optical processor 300, the third relay 334 supplies the DC voltage from the DC voltage source 336 to the light detection means 332 while it also supplies the extinction current generated at the light detection means to the second electric signal processing device 332.

Furthermore, the optical processor 300 may includes other structural elements than the mentioned above, for instance, an impedance matching element such as a terminating set of 50, Ω connected in parallel with the EA modulator 310. In this case, this impedance matching element plays a role of take the impedance matching such that the sinusoidal voltage is efficiently applied to the EA modulator 310.

Still further, in the optical processor 300 including the impedance matching element, it may be possible to connect a condenser having a pertinent capacity in series with the impedance matching element. In this case, the condenser plays a role of cutting the DC current component flowing through the impedance matching element due to the bias voltage applied to the EA modulator 310.

In the optical processor 300, a photodiode, an EA modulator or the like may be used as the light detection means 330 while an electric signal processing device, a decoder or the like may be used as the first and second electric signal processing devices 312 and 332. Furthermore, an electric circulator or a wavelength filter for electric signal may be used as the first relay 316.

Here, in case of using the wavelength filter for the electric signal as the first relay 316 of the optical processor 300, only the high frequency current or the beat of a corresponding frequency can be detected and processed at each electric signal processing device 312 as described in the following (c) and (d). Needless to say, the wavelength can be expressed as the reciprocal of the frequency, thus the frequency filter can be used as the first relay 316 just the same as the wavelength filter.

(c) The high frequency voltage of a frequency f0 generated by the sinusoidal voltage generator 314-$i$, (i: integer) is applied to the EA modulator 310-$i$, through the first and second relays 316-$i$, and 318-$i$. On one hand, the current component having a predetermined frequency f1 in the high frequency current caused by the light absorption at the EA modulator 310-$i$, , is extracted through the second relay 318-$i$, and the first relay 316-$i$, , and is inputted to the first electric signal processing device 312.

(d) The high frequency voltage of a frequency f0 generated by the sinusoidal voltage generator 314-$i$, is inputted to the EA modulator 310-$i$, through the first and second relays 316-$i$, and 318-$i$. On one hand, the high frequency current (including the current component of a frequency f0+Δfi/f0−Δfi) caused by the light absorption at the EA modulator 310-*i*, , is inputted to the first relay 316-*i*, via the second relay 318- i. Then, only the beat component Δfi is extracted at the first relay 316-*i*, , and the extracted beat component Δfi is inputted to the first electric signal processing device 312-*i*.

In the optical processor constituted above, it is possible to carry out a variety of optical processings such as intensity modulation, optical gate processing, coding, or optical demultiplexing, by making use of the ability of light absorption and modulation of the EA modulator 310. At the same time, in the optical processor 300, light detection, signal detection, or generation of electric signals varying at a predetermined period can be carried out by making use of the photoelectric conversion by the EA modulator 310 and the detection of the extinction current by the first electric signal processing device 312.

The optical processing by the EA modulator 310 as mentioned above is applicable to various input light such as continuous light, laser light, optical pulses (optical bright pulses, optical dark pulses), or multiplex optical signals used in various systems (e.g. time-division system, wavelength-division system, alternating multiplex system). The optical processing carried out by the EA modulator 310 can be controlled with ease by adjusting the sinusoidal voltage generated by the sinusoidal voltage generator 314 and the bias voltage generated by the bias voltage generator 320.

Furthermore, in the optical processor 300, the operation timing of the phase controller 340 can be sequentially, or regularly, or randomly shifted by means of the phase controller 340. Accordingly, the operation timing of the EA modulator and the wavelength of the modulable light can be set on the basis of respective EA modulators, and it becomes possible to freely execute the detection and demultiplexing of the high speed optical signal in combination of various system such as the wavelength-division system, the time-division multiplex system, and alternating multiplex system.

Also, in the optical processor 300, light detection, signal detection, or generation of electric signals varying at a predetermined period can be carried out by making use of the photoelectric conversion by the light detection means 330 and the extinction current detection by the second electric signal processing device 332. Similar to the optical processing by the above EA modulator 310, the optical processing by the light detection means 330 is applicable to various kinds of input light such as continuous light, laser light, optical pulses (optical bright pulses, optical dark pulses), or multiplex optical signals used in various systems (e.g. time-division system, wavelength sharing system, alternating multiplex system). The optical processing carried out by the light detection means 330 can be controlled with ease by adjusting the DC voltage of the DC voltage source 136.

Accordingly, in the entire optical processor 300 according to the present embodiment, more various kinds of optical processings can be performed by combining the optical processing by a plurality of EA modulators 310 with the optical processing by the light detection means 330. For instance, in the optical processor 300, it becomes possible to receive the multiplexed optical signal of the alternating multiplex system without branching it in parallel. Also, it becomes possible to receive the multiplexed optical signal having such a speed that far exceeds respective operational speed limits of a single EA modulator 310 and a single light detection means 330. Further, it becomes possible to apply the photoelectric conversion to the optical signal coded by the EA modulator 310 by means of the light detection means 330 and to form the electric signal from the converted by means of the second electric signal processing device 332.

Here, let us explain about a concrete application example of the optical processor 300. In this example, the detection of the time-division n-times multiplexed optical signal by the optical processor 300 will be described with reference to FIGS. 14 through 16.

FIG. 14 is a diagram showing the change of the transmittance and the normalized extinction current due to the voltage applied to the EA modulator 310 (with a pin junction), and setting of the voltage to be applied to the EA modulator. Normally, as shown in FIG. 14, the EA modulator 310 generates the extinction current when applying the reverse bias voltage thereto in the same manner as the EA modulator having a diode structure. The change of such extinction current is represented by the waveform which is attained by inverting the transmittance waveform of the input light to the EA modulator 310 upside down.

Then, the high frequency sinusoidal voltage is applied to EA modulators 310 such that each valley of the high frequency sinusoidal voltage is placed on each optical pulse signal of the corresponding optical pulse signal series received by each EA modulator. To be more concrete, each valley of the high frequency voltage applied to the EA modulator 310-1 is placed on each optical pulse signal of the first optical pulse signal series (a1, a2, a3, a4 . . . of the input optical signal shown in FIG. 16*a*), and each valley of the high frequency voltage applied to the EA modulator 310-2 is placed on each optical pulse signal of the second optical pulse signal series (b1, b2, b3, b4 . . . of the input optical signals shown in FIG. 16*a*). In the same way, each valley of the high frequency voltage applied to the EA modulators 310-3 through 310-(n−2) is placed on each optical pulse signal of the corresponding optical pulse signal series, and each valley of the high frequency voltage applied to the EA modulator 310-(n−1) is placed on each optical pulse signal of the (n−1)th optical pulse signal series ((n−1)1, (n−1)2, (n−1)3, (n−1)4 . . . of the input optical signal shown in FIG. 16*a*).

Under the setting condition like this, when the n-times multiplexed optical signal shown in FIG. 16*a*, is inputted to the optical processor 300, there are generated in each EA modulator 310 current pulse signals as output electric signals shown in FIG. 16*b*, namely, the current pulse signals a1, a2, a3, a4. . . =1, 0, 0, 1 . . . in the EA modulator 310-1, the current pulse signals b1, b2, b3, b4 . . . =0, 1, 0, 1 . . . in the EA modulator 310-2, and the current pulse signals n1, n2, n3, n4 . . . =1, 0, 1, 1 . . . in the EA modulator 310-(n−1).

These current pulse signals generated in the EA modulator 310 flow to each of corresponding electric signal processing devices 312 via each of corresponding second relays 318 and each of corresponding first relays 116, and are received and processed there. As a result, optical signals having passed through EA modulator 310-1 through 310-(n−1) come to include only the optical pulse signals of the nth series (n1, n2, n3, n4. . . =1, 0, 1, 1 . . . of the input optical signal shown in FIG. 16*a*).

Accordingly, the current pulse signals n1, n2, n3, n4 . . . =1, 1, 0, 1, . . . can be received and processed by only applying the DC reverse voltage Vbn to the light detection means 330. In this case, it is desirable that the DC reverse voltage Vbn is set such that the transmittance of the light inputted to the light detection means 330 is completely in the OFF-state region.

FIG. 15 shows the normalized optical output characteristic and the normalized extinction current characteristic of the EA modulator 310 and the same of the light detection means 330 in the application example of the embodiment as described in the above.

In this application example, it is desirable to set the amplitude and the DC reverse bias voltage Vb1 through Vb(n-1) of the high frequency voltage such that the optical current gate width is equal to about 1-time slot of the input optical signal. With this desirable setting, the more the input optical signal is multiplexed, the more the DC bias voltage is shifted to the positive voltage side. Contrary to this, in case of the prior art system, the more the input optical signal is multiplexed, the more the DC bias voltage is shifted to the negative voltage side.

Furthermore, in this application example, the high frequency voltage applied to an arbitrary EA modulator 310 may be combined with the optical pulse signal of an arbitrary series. In other words, it is not always necessary that the order of the EA modulator 310 coincides with that of the multiplexed series of the optical signal. In such an arbitrary setting, if there is suitably set the detection timing by the optical current gate in each EA modulator 310, the amplitude and the DC reverse bias voltage of the high frequency voltage applied to EA modulator 310 in the following stage can be made smaller, thus the power consumption being reduced.

Next, an example of the structure of the optical processor 300 as explained above, will now be more concretely described with reference to an optical signal receiver 350 shown in FIG. 13, which is applicable to detection of the time-division n-times multiplexed optical signal used in the application example as described above. As shown in FIG. 13, the optical signal receiver 350 includes an integrated optical element 390 which is provided with EA modulator regions 360 of (n-1) and a light receiving region 380, the first electric circuit 352 for driving EA modulator regions 360, and the second electric circuit 354 for driving the light receiving region 380.

In the integrated optical element 390, the EA modulator region 360 corresponding to the EA modulator 310 (FIG. 12) and the light receiving region 380 corresponding to the light detection means 330 (FIG. 12), are formed such that they are integrated in series on an identical substrate so as to have an optical waveguide in common. In the integrated optical element 390, there are formed a lower electrode which is used in common by both of the EA modulator region 360 and the light receiving region 380, an upper electrode for use in the EA modulator region 360, and another upper electrode for use in the light receiving region 380. In the optical signal receiver 350, the lower electrode of the integrated optical element 390 is grounded. In the integrated optical element 390 described above, the optical waveguides arranged between adjacent EA modulator regions 360 and also between the EA modulator 360-(n-1) and the light receiving region 380, play a role of optically connecting adjacent regions with each other, and also play a role of electrically isolating adjacent regions from each other.

The first electric circuit 352 corresponds to the first electric circuit 302 of the optical processor 300 shown in FIG. 12, supplies the high frequency voltage to each of EA modulators 360, this voltage having a phase corresponding to each EA modulator 360 and being superimposed on the bias voltage, and at the same time, detects the extinction current generated in the EA modulator 360. The first electric circuit 352 like this can be formed by adding a control circuit for controlling the operation of a high frequency voltage generator (like 164 in FIG. 2) to each of first electric circuits (like 152 in FIG. 2) of (n-1).

The second electric circuit 354 corresponds to the second electric circuit 304 of the optical processor 300 shown in FIG. 12. This circuit supplies the DC bias voltage to the light receiving region 380 and detects the extinction current generated in the light receiving region 380. The second electric circuit 154 in FIG. 2 may be used as the second electric circuit 354.

According to the present embodiment, there can be received even the extinction current that is generated through the optical gating operation in the EA optical modulator region 360, so that the energy of the input optical signal is not wasted, thus the energy being efficiently used. Furthermore, according to the present embodiment, it is not necessary to divide n-times multiplexed signal trains into n-parallel branches before executing optical gating operation. Thus, there is no need to provide any amplifier circuit for compensating the power loss caused by branching those signal trains in parallel, so that there can be reduced the power consumption and the scale of the entire optical processor.

Still further, according to the present embodiment, if the multiplex factor of the optical signal to be received becomes large, the DC bias voltage to be applied is shifted to the positive voltage side. In this case, however, as the current flows only when the optical gating is executed, DC inverse bias voltage is unnecessarily applied to EA modulator for extinction, so that the longer stable operation of the EA modulator can be expected. That is, according to the present embodiment, there can be solved the above-mentioned two problems in association with the first problem related to the prior art optical gate device.

As a result, according to the present embodiment, there are provided the optical gating method and light-to-current conversion method applicable to the future ultra-high speed optical communication and the processing of the ultra-high speed optical signal, especially the optical gating method and light-to-current conversion method for processing the time-division multiplexed optical signal, and the optical processor which can execute those methods.

(Fourth Embodiment)

Finally, the fourth embodiment according to the invention will be described with reference to FIGS. 18 and 19. In these figures, FIG. 18 is a block diagram for explaining an optical processor 400 according to the fourth embodiment, and FIG. 19 is a diagram for explaining the operation of the optical processor 400.

Figure 18:
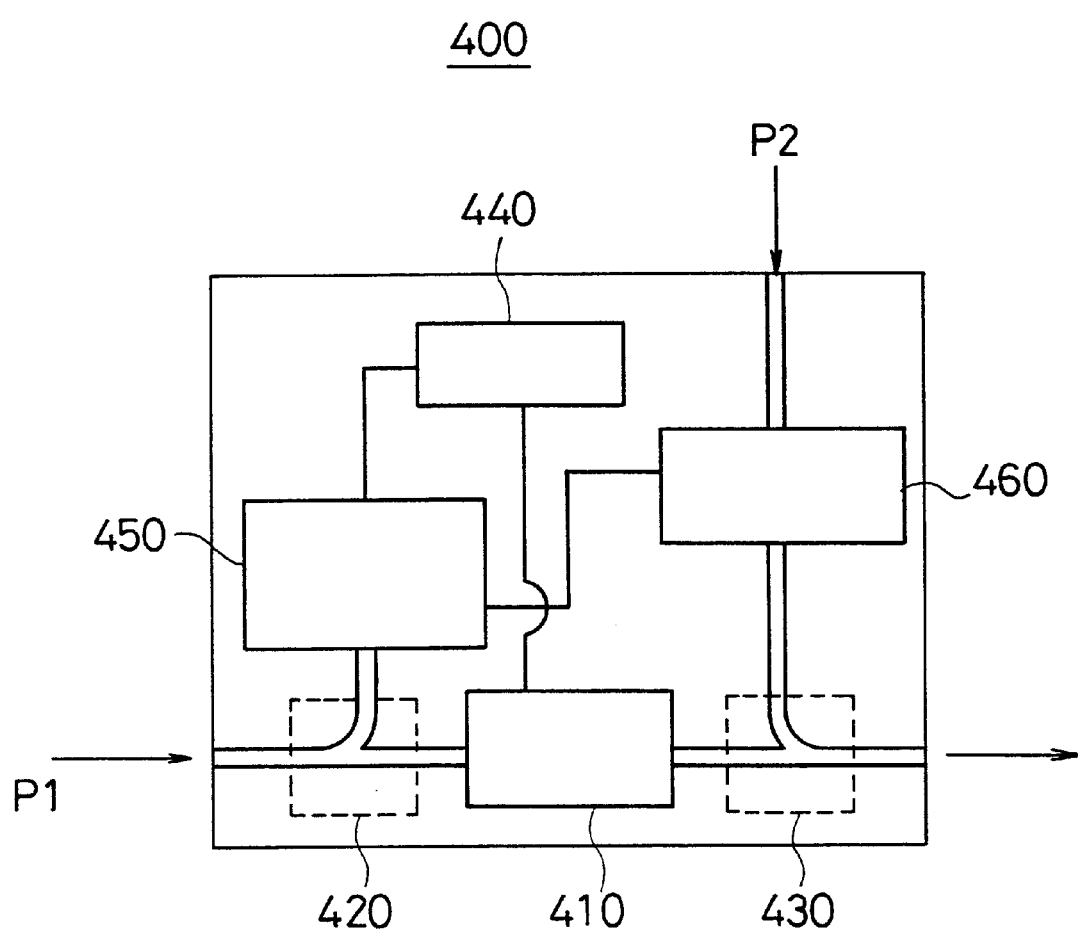
FIG. 18 is a block diagram for explaining the basic structure of still another optical processor to which the invention is applicable.

As shown in FIG. 18, the optical processor 400 is an Add/Drop device making use of an EA modulator 410 having the triode structure. Besides this EA modulator 410, the optical processor 400 includes an optical wave divider 420, an optical wave composer 430. Furthermore, the optical processor 400 includes a voltage generator 440 which generates the superimposed voltage which is formed by superimposing the sinusoidal voltage on the bias voltage, a controller 450 consisting of a clock extracting part and a phase detecting part, and a phase adjustment device 460.

First of all, there will be explained the optical connection between structural elements of the optical processor 400. The optical input port of the EA modulator 410 is connected with one optical output port of the optical wave divider 420 while the output port of the EA modulator is connected with the one optical input port of the optical wave composer 430. Furthermore, the other optical output port of the optical wave divider 420 is connected with the optical input port of the controller 450, and the other optical input port of the optical wave composer 430 is connected with the optical output port of the phase adjustment device 460.

In the next, there will be explained the electrical connection in the optical processor 400. The controller 450 is connected with the control port of the voltage generator 440 and also with the control port of the phase adjustment device 460. The output electrode of the voltage generator 440 is connected with the upper electrode (control port) of the EA modulator 410.

Figure 19A:
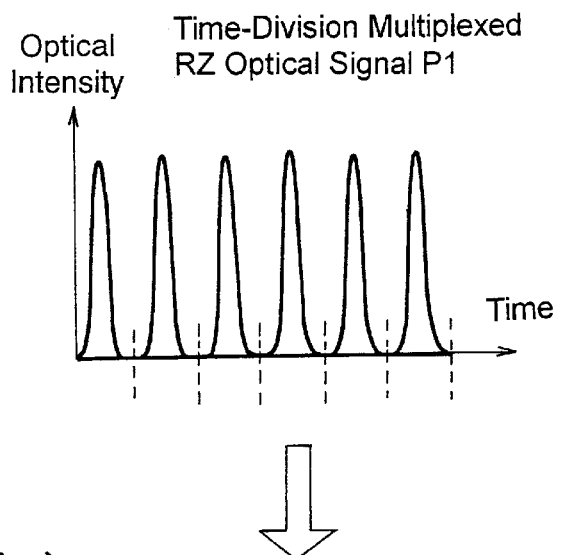
FIGS. 19a, 19b, & 19c, shows diagrams for explaining the operation of the optical processor shown in FIG. 18.

The operation of the optical processor 400 will now be explained with reference to FIG. 19. In the operation of the optical processor 400, there are inputted thereto the time-division multiplexed RZ optical signal P1 shown in FIG. 19a, and the optical signal P2 to be added to the RZ optical signal P1 shown in FIG. 19c.

In the optical processor 400, the RZ optical signal P1 is divided by the optical wave divider 420, and the divided parts are inputted to the EA modulator 410 and the controller 450, respectively. The controller 450 executes the clock (CLK) extraction and the phase detection with respect to the inputted RZ optical signal P1. The extracted clock information and the detected phase information are inputted to the voltage generator 440 and the phase adjustment device 460, respectively.

The voltage generator 440 generates the sinusoidal voltage of which the amplitude and the phase have been adjusted, and the DC bias voltage of which the magnitude has been adjusted, these adjustment being carried out based on the above clock information and the phase information. Then, the superimposed voltage formed by superimposing the sinusoidal voltage on the DC bias voltage is applied to the EA modulator 410.

Figure 19B:
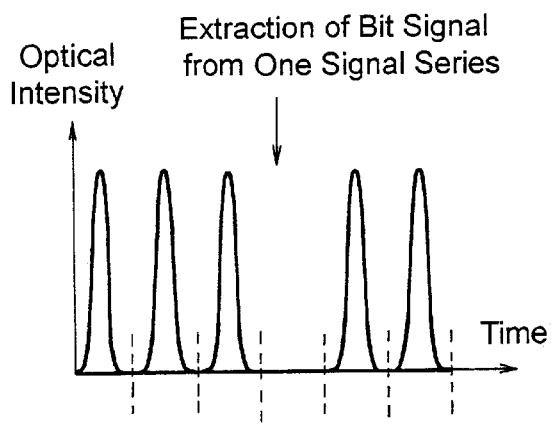
Figure 19C:
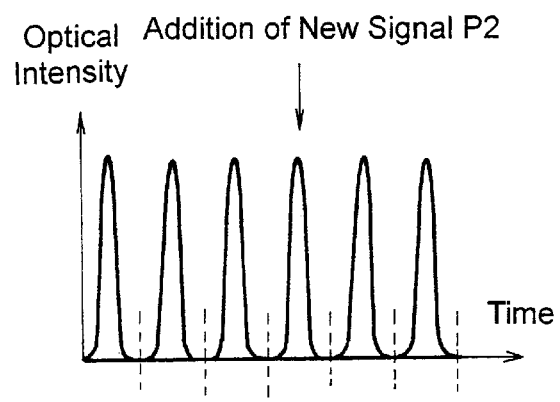

With respect to the RZ optical signal P1, the EA modulator 410 absorbs (does not transmits) a predetermined series of optical signals, for instance a series of optical bit signals in response to the above superimposed voltage applied thereto, and allows the remaining optical bit signals to transmit therethrough as shown in FIG. 19b, and outputs them from its output port. The RZ optical signal P1 outputted from the EA modulator 410 is then inputted to the optical wave composer 430.

Then, the optical signal P2 is inputted to the phase adjustment device 460, which in turn outputs the optical signal P2 to the optical wave composer 430 at a predetermined timing based on the clock information and the phase information which are supplied from the controller 450. The RZ optical signal P1 outputted from the EA modulator 410 and the optical signal P2 are composed by the optical wave composer 430, and the optical signal shown in FIG. 19c, is outputted from the optical processor 400 to the outside. As a result, the optical signal P2 is added to the bit of the RZ optical signal P1 absorbed in the EA modulator 410, thereby the optical add/drop operation by the optical processor 400 being completed.

As explained before in connection with the second embodiment, the EA modulator 410 having the triode structure can start its operation by applying the forward bias thereto, and it is possible to arbitrarily set a time ratio on transmission versus non-transmission of the optical signal i.e. a duty ratio. Accordingly, it is possible to freely control the transmission and non-transmission of the arbitrary bit in the RZ optical signal P1.

In the optical processor 400, the phase adjustment device 460 is provided for the purpose of adjusting the timing at which the optical signal P2 is inputted to the optical wave composer 430, so that it will not be specially required to provide the phase adjustment device if there are adjusted the input timing of the time-division optical signal P1 and the optical signal P2.

As described above, the optical add/drop device can be simply constructed by making use of only the optical wave divider, the optical wave composer, and the EA modulator having the triode structure. Accordingly, there is provided at a low cost a highly reliable optical processor for use in processing the time-division optical signal.

The invention has been described so far by way of several preferred embodiments according thereto. However, the invention should not be limited by such embodiments. Any one skilled in the art would be able to add various modifications and changes to the invention within the technical thought recited in the scope of claims for patent attached hereto. It should be understood that such change and modification will fall in the range of the technical thought according to the invention.

The structure described in connection with various embodiments is simplified to the extent that the invention can be understood with ease, so that the invention should not limited by such structure. For instance, materials, structures (bulk layer, quantum well structure), dimensions, etc. of the semiconductor piled-up layer body forming the EA modulator should not be limited by those which have been described in connection with the embodiments.

Although not described above, the invention is applicable to the optical processor including an EA modulator in which a semiconductor optical amplifier, a semiconductor laser, etc. are integrated, for instance.

In the above embodiments, there have been described examples of the optical processor of the class in which the sinusoidal voltage is applied to the EA modulator. This has been done just because the sinusoidal voltage can be handled and controlled with ease. However, the invention should not be limited by such structure. The invention is applicable to the optical processor using the voltage of various waveforms applied to the EA modulator, for instance triangle waveform, rectangular waveform, and so on. Actually, however, the sinusoidal voltage applied to the EA modulator has the waveform which is a little distorted from the normal sinusoidal waveform due to the characteristic of the sinusoidal wave generator, transmission function of the transmission medium, reflection from various parts, etc.

According to the invention, as the EA modulator having the triode or diode structure can be used as the light detection means, there is provided the optical processor which is excellent in effectively converting the input light energy into the electric one, and also in the high speed receiving operation of optical and electrical signals.

Furthermore, according to the invention, as the EA modulator having the triode structure can be used as the light detection means or the demultiplexing means, there is provided the optical processor which is provided with improved operational controllability, widened variable range of the duty ratio, well suppression against the carrier injection to the absorption layer, or stable workability over a long time.

The entire disclosure of Japanese Patent Application No. 10-337960, filed on Nov. 27, 1998, and Japanese Patent Application No. 11-306173, filed on Oct. 28, 1999, including specifications, claims, drawings and summary is incorporated herein by reference in its entirety.

What is claimed is:

1. An optical processor comprising:
   one optical modulator of the electro-absorption types or two or more optical modulators of the electro-absorption type which are optically connected in series with each other;
   at least one voltage generation means which is electrically connected with said one or more optical modulators, and generates a modulation voltage to be supplied to said one or more optical modulators; and at least one electric current detection means which is electrically connected with said one or more optical modulators and detects the extinction current generated in said optical modulator.

2. An optical processor as claimed in claim 1 further comprising at least one relay means which relays the electrical connection between said voltage generation means and said optical modulator and also the electrical connection between said electric current detection means and said optical modulator, and supplies the said modulation voltage generated by said voltage generation means to said optical modulator, and also supplies said extinction current generated by said optical modulator to said electric current detection means.

3. An optical processor as claimed in claim 2, wherein said relay means includes an electric circulator.

4. An optical processor as claimed in claim 2, wherein said relay means includes a filter acting on the wavelength of the electric signal.

5. An optical processor as claimed in claim 2, wherein said relay means includes a filter acting on the frequency of the electric signal.

6. An optical processor as claimed in claim 1, wherein each of said optical modulators has a triode structure achieved by a junction between two semiconductor regions of a first conductivity type via a semiconductor region of a second conductivity type that is opposite the first conductivity type.

7. An optical processor as claimed in claim 6, wherein the triode structure of said optical modulators comprises a pinip junction or an nipin junction.

8. An optical processor as claimed in claim 6, wherein the triode structure of said optical modulators comprises a pinp junction or an nipn junction.

9. An optical processor as claimed in claim 1 further comprising a light detection means which is optically connected with said one optical modulator or with the last stage of a sequence of said optical modulators.

10. An optical processor as claimed in claim 1, wherein there are two or more of said optical modulators, with the respective operation timings being set to be different from one another.

11. An optical processor as claimed in claim 1, wherein there are two or more of said optical modulators and a means for adjusting the operation timing of modulators, which shifts the operation timing of one optical modulator from that of the others.

12. An optical processor comprising: one optical modulator of the electro-absorption type or a plurality of optical modulators of the electro-absorption type which are optically connected in series with each other, with each of said optical modulators having a triode structure achieved by a junction between two semiconductor regions of a first conductivity type via a semiconductor region of a second conductivity type that is opposite the first conductivity type; and at least one voltage generation means which is electrically connected with said one or said plurality of optical modulators and generates a modulation voltage to be supplied to said one or said plurality of optical modulators.

13. An optical processor as claimed in claim 12, wherein the triode structure of said optical modulators comprises a pinip junction or an nipin junction.

14. An optical processor as claimed in claim 12, wherein the triode structure of said optical modulators comprises a pinp junction or an nipn junction.

15. An optical processor as claimed in claim 12 further comprising a light detection means which is optically connected with said one optical modulator or with the last stage of a sequence of said plurality of optical modulators.

16. An optical processor as claimed in claim 12, wherein there are two or more optical modulators, with the operation timing of one modulator being different from that of the other.

17. An optical processor as claimed in claim 12, wherein there are two or more optical modulators and a means for adjusting the operation timing of said modulators such that the operation timing of one optical modulator is shifted from that of the other.

18. An optical processor wherein the optical signal can be extracted from a time-division multiplexed optical signal train at a predetermined time interval and the other optical signal can be added to said optical signal train at said time interval, comprising one optical modulator of the electro-absorption type, or two or more optical modulators of the electro-absorption type which are optically connected in series with each other, with all of said optical modulators having a triode structure achieved by a junction between two semiconductor regions of a first conductivity type via a semiconductor region of a conductivity type that is opposite the first conductivity type, and extracting the optical signal.

19. An optical processor as claimed in claim 18, wherein the triode structure of said optical modulators comprises a pinip junction or an nipin junction.

20. An optical processor as claimed in claim 18, wherein the triode structure of said optical modulators comprises a pinp junction or an nipn junction.

21. An optical processor as claimed in claim 18, wherein there are two or more optical modulators, with the operation timing of one modulator being different from that of the other.

22. An optical processor as claimed in claim 18, wherein there are two or more optical modulators and a means for adjusting the operation timing of said modulators such that the operation timing of one optical modulator is shifted from that of the other.

* * * * *